(12) United States Patent
Jackson et al.

(10) Patent No.: US 8,501,838 B2
(45) Date of Patent: Aug. 6, 2013

(54) COMPOSITE WOOD BOARD

(75) Inventors: Roger Jackson, St. Helens (GB); Tony Aindow, St. Helens (GB); George Baybutt, St. Helens (GB)

(73) Assignee: Knauf Insulation SPRL (BE)

( * ) Notice: Subject to any disclaimer, the term of this patent is extended or adjusted under 35 U.S.C. 154(b) by 235 days.

(21) Appl. No.: 12/524,522

(22) PCT Filed: Jan. 25, 2007

(86) PCT No.: PCT/EP2007/050746
§ 371 (c)(1),
(2), (4) Date: Nov. 12, 2009

(87) PCT Pub. No.: WO2008/089847
PCT Pub. Date: Jul. 31, 2008

(65) Prior Publication Data
US 2010/0087571 A1    Apr. 8, 2010

(51) Int. Cl.
*C08L 97/02* (2006.01)

(52) U.S. Cl.
USPC ............ 524/13; 524/14; 524/18; 524/33

(58) Field of Classification Search
USPC ........................................ 524/13, 14, 18, 33
See application file for complete search history.

(56) References Cited

U.S. PATENT DOCUMENTS

| | | |
|---|---|---|
| 1,801,052 A | 4/1931 | Meigs |
| 1,801,053 A | 4/1931 | Meigs |
| 1,886,353 A | 11/1932 | Novotny et al. |
| 2,198,874 A | 4/1940 | Holmes |
| 2,215,825 A | 9/1940 | Wallace |
| 2,392,105 A | 1/1946 | Sussman |
| 2,442,989 A | 6/1948 | Sussman |
| 2,518,956 A | 8/1950 | Sussman |
| 2,875,073 A | 2/1959 | Gogek |
| 3,232,821 A | 2/1966 | Moore et al. |
| 3,297,419 A * | 1/1967 | Eyre, Jr. ........................ 44/534 |
| 3,513,001 A | 5/1970 | Worthington et al. |
| 3,791,807 A | 2/1974 | Etzel |
| 3,802,897 A | 4/1974 | Voigt et al. |
| 3,809,664 A | 5/1974 | Fanta |
| 3,826,767 A | 7/1974 | Hoover et al. |
| 3,856,606 A | 12/1974 | Fan et al. |
| 3,867,119 A | 2/1975 | Kasuga et al. |
| 3,911,048 A | 10/1975 | Vargiu et al. |
| 4,014,726 A | 3/1977 | Fargo |
| 4,028,290 A | 6/1977 | Reid |
| 4,048,127 A | 9/1977 | Gibbons et al. |

(Continued)

FOREIGN PATENT DOCUMENTS

| | | |
|---|---|---|
| AU | 2003237324 A1 | 12/2003 |
| CA | 1090026 A | 11/1980 |

(Continued)

OTHER PUBLICATIONS

International Search Report and Written Opinion for PCT/EP2007/050747, completed Jun. 27, 2007.

(Continued)

*Primary Examiner* — Robert D. Harlan
(74) *Attorney, Agent, or Firm* — Barnes & Thornburg LLP

(57) ABSTRACT

In a stack of composite wood boards, the wood boards comprise wood particles and an organic binder.

20 Claims, 5 Drawing Sheets

(56) References Cited

U.S. PATENT DOCUMENTS

| | | |
|---|---|---|
| 4,054,713 A | 10/1977 | Sakaguchi et al. |
| 4,085,076 A | 4/1978 | Gibbons et al. |
| 4,097,427 A | 6/1978 | Aitken et al. |
| 4,107,379 A | 8/1978 | Stofko |
| 4,148,765 A | 4/1979 | Nelson |
| 4,183,997 A | 1/1980 | Stofko |
| 4,184,986 A | 1/1980 | Krasnobajew et al. |
| 4,186,053 A | 1/1980 | Krasnobajew et al. |
| 4,201,857 A | 5/1980 | Krasnobajew et al. |
| 4,233,432 A | 11/1980 | Curtis, Jr. |
| 4,246,367 A | 1/1981 | Curtis, Jr. |
| 4,278,573 A | 7/1981 | Tessler |
| 4,296,173 A | 10/1981 | Fahey |
| 4,301,310 A | 11/1981 | Wagner |
| 4,330,443 A | 5/1982 | Rankin |
| 4,357,194 A | 11/1982 | Stofko |
| 4,396,430 A | 8/1983 | Matalon |
| 4,400,496 A | 8/1983 | Butler |
| 4,464,523 A | 8/1984 | Neigel |
| 4,506,684 A | 3/1985 | Keritsis |
| 4,668,716 A | 5/1987 | Pepe et al. |
| 4,754,056 A | 6/1988 | Ansel et al. |
| 4,845,162 A | 7/1989 | Schmitt et al. |
| 4,906,237 A | 3/1990 | Johansson et al. |
| 4,912,147 A | 3/1990 | Pfoehler et al. |
| 4,923,980 A | 5/1990 | Blomberg |
| 5,037,930 A | 8/1991 | Shih |
| 5,041,595 A | 8/1991 | Yang |
| 5,095,054 A | 3/1992 | Lay |
| 5,106,615 A | 4/1992 | Dikstein |
| 5,114,004 A | 5/1992 | Isono et al. |
| 5,124,369 A | 6/1992 | Vandichel et al. |
| 5,143,582 A | 9/1992 | Arkens et al. |
| 5,151,465 A | 9/1992 | Le-Khac |
| 5,308,896 A | 5/1994 | Hansen et al. |
| 5,318,990 A | 6/1994 | Strauss |
| 5,336,753 A | 8/1994 | Jung et al. |
| 5,336,755 A | 8/1994 | Pape |
| 5,340,868 A | 8/1994 | Strauss et al. |
| 5,387,665 A | 2/1995 | Misawa et al. |
| 5,393,849 A | 2/1995 | Srinivasan et al. |
| 5,434,233 A | 7/1995 | Kiely et al. |
| 5,480,973 A | 1/1996 | Goodlad et al. |
| 5,498,662 A | 3/1996 | Tanaka et al. |
| 5,536,766 A | 7/1996 | Seyffer et al. |
| 5,547,541 A | 8/1996 | Hansen et al. |
| 5,571,618 A | 11/1996 | Hansen et al. |
| 5,578,678 A | 11/1996 | Hartmann |
| 5,582,682 A | 12/1996 | Ferretti |
| 5,583,193 A | 12/1996 | Aravindakshan et al. |
| 5,589,536 A | 12/1996 | Golino et al. |
| 5,609,727 A | 3/1997 | Hansen et al. |
| 5,614,570 A | 3/1997 | Hansen et al. |
| 5,620,940 A | 4/1997 | Birbara et al. |
| 5,621,026 A | 4/1997 | Tanaka et al. |
| 5,633,298 A | 5/1997 | Arfaei et al. |
| 5,643,978 A | 7/1997 | Darwin et al. |
| 5,645,756 A | 7/1997 | Dubin et al. |
| 5,661,213 A | 8/1997 | Arkens et al. |
| 5,690,715 A | 11/1997 | Schiwek |
| 5,691,060 A | 11/1997 | Levy |
| 5,693,411 A | 12/1997 | Hansen et al. |
| 5,756,580 A | 5/1998 | Natori et al. |
| 5,788,243 A * | 8/1998 | Harshaw et al. .............. 273/363 |
| 5,855,987 A | 1/1999 | Margel et al. |
| 5,885,337 A | 3/1999 | Nohr et al. |
| 5,895,804 A | 4/1999 | Lee et al. |
| 5,919,831 A | 7/1999 | Philipp |
| 5,925,722 A | 7/1999 | Exner |
| 5,929,184 A | 7/1999 | Holmes-Farley et al. |
| 5,932,344 A | 8/1999 | Ikemoto et al. |
| 5,932,665 A | 8/1999 | DePorter et al. |
| 5,932,689 A | 8/1999 | Arkens et al. |
| 5,942,123 A | 8/1999 | McArdle |
| 5,977,224 A | 11/1999 | Cheung et al. |
| 5,977,232 A | 11/1999 | Arkens et al. |
| 5,981,719 A | 11/1999 | Woiszwillo et al. |
| 5,983,586 A | 11/1999 | Berdan, II et al. |
| 5,990,216 A | 11/1999 | Cai et al. |
| 6,072,086 A | 6/2000 | James et al. |
| 6,077,883 A | 6/2000 | Taylor et al. |
| 6,090,925 A | 7/2000 | Woiszwillo et al. |
| 6,114,033 A | 9/2000 | Ikemoto et al. |
| 6,114,464 A | 9/2000 | Reck et al. |
| 6,136,916 A | 10/2000 | Arkens et al. |
| 6,143,243 A | 11/2000 | Gershun et al. |
| 6,171,444 B1 | 1/2001 | Nigam |
| 6,171,654 B1 | 1/2001 | Salsman et al. |
| 6,210,472 B1 | 4/2001 | Kwan et al. |
| 6,221,973 B1 | 4/2001 | Arkens et al. |
| 6,274,661 B1 | 8/2001 | Chen et al. |
| 6,299,936 B1 | 10/2001 | Reck et al. |
| 6,310,227 B1 | 10/2001 | Sarama et al. |
| 6,313,102 B1 | 11/2001 | Colaco et al. |
| 6,319,683 B1 | 11/2001 | James et al. |
| 6,331,350 B1 | 12/2001 | Taylor et al. |
| 6,348,530 B1 | 2/2002 | Reck et al. |
| 6,379,739 B1 | 4/2002 | Formanek et al. |
| 6,395,856 B1 | 5/2002 | Petty et al. |
| 6,440,204 B1 | 8/2002 | Rogols |
| 6,468,442 B2 | 10/2002 | Bytnar |
| 6,468,730 B2 | 10/2002 | Fujiwara et al. |
| 6,482,875 B2 | 11/2002 | Lorenz et al. |
| 6,495,656 B1 | 12/2002 | Haile et al. |
| 6,525,009 B2 | 2/2003 | Sachdev et al. |
| 6,638,884 B2 | 10/2003 | Quick et al. |
| 6,699,945 B1 | 3/2004 | Chen et al. |
| 6,730,730 B1 | 5/2004 | Hansen et al. |
| 6,753,361 B2 | 6/2004 | Kroner et al. |
| 6,818,694 B2 | 11/2004 | Hindi et al. |
| 6,852,247 B2 | 2/2005 | Bytnar |
| 6,858,074 B2 | 2/2005 | Anderson et al. |
| 6,861,495 B2 | 3/2005 | Barsotti et al. |
| 6,864,044 B2 | 3/2005 | Ishikawa et al. |
| 6,878,800 B2 | 4/2005 | Husemoen et al. |
| 6,955,844 B2 | 10/2005 | Tagge et al. |
| 7,029,717 B1 | 4/2006 | Ojima et al. |
| 7,067,579 B2 | 6/2006 | Taylor et al. |
| 7,083,831 B1 | 8/2006 | Koch et al. |
| 7,090,745 B2 | 8/2006 | Beckman |
| 7,141,626 B2 | 11/2006 | Rodrigues et al. |
| 7,195,792 B2 | 3/2007 | Boston et al. |
| 7,201,778 B2 | 4/2007 | Smith et al. |
| 7,458,235 B2 | 12/2008 | Beaufils et al. |
| 7,514,027 B2 | 4/2009 | Horres et al. |
| 7,655,711 B2 | 2/2010 | Swift et al. |
| 7,772,347 B2 | 8/2010 | Swift et al. |
| 7,807,771 B2 | 10/2010 | Swift et al. |
| 7,888,445 B2 | 2/2011 | Swift et al. |
| 7,947,765 B2 | 5/2011 | Swift et al. |
| 8,114,210 B2 | 2/2012 | Hampson et al. |
| 8,182,648 B2 | 5/2012 | Swift et al. |
| 2002/0032253 A1 | 3/2002 | Lorenz et al. |
| 2002/0091185 A1 | 7/2002 | Taylor |
| 2002/0130439 A1 | 9/2002 | Kroner et al. |
| 2002/0161108 A1 | 10/2002 | Schultz et al. |
| 2003/0005857 A1 | 1/2003 | Minami et al. |
| 2003/0153690 A1 | 8/2003 | Husemoen et al. |
| 2004/0019168 A1 | 1/2004 | Soerens et al. |
| 2004/0024170 A1 | 2/2004 | Husemoen et al. |
| 2004/0033747 A1 | 2/2004 | Miller et al. |
| 2004/0038017 A1 | 2/2004 | Tutin et al. |
| 2004/0077055 A1 | 4/2004 | Fosdick et al. |
| 2004/0122166 A1 | 6/2004 | O'Brien-Bernini et al. |
| 2004/0152824 A1 | 8/2004 | Dobrowolski |
| 2004/0249066 A1 | 12/2004 | Heinzman et al. |
| 2004/0254285 A1 | 12/2004 | Rodrigues et al. |
| 2005/0020224 A1 | 1/2005 | Locatelli et al. |
| 2005/0059770 A1 | 3/2005 | Srinivasan |
| 2005/0171085 A1 | 8/2005 | Pinto et al. |
| 2005/0196421 A1 | 9/2005 | Hunter et al. |
| 2005/0215153 A1 | 9/2005 | Cossement et al. |
| 2005/0275133 A1 | 12/2005 | Cabell et al. |
| 2006/0005580 A1 | 1/2006 | Espiard et al. |

| | | | |
|---|---|---|---|
| 2006/0044302 | A1 | 3/2006 | Chen |
| 2006/0099870 | A1 | 5/2006 | Garcia et al. |
| 2006/0111480 | A1 | 5/2006 | Hansen et al. |
| 2006/0135433 | A1 | 6/2006 | Murray et al. |
| 2006/0252855 | A1 | 11/2006 | Pisanova |
| 2006/0281622 | A1 | 12/2006 | Maricourt et al. |
| 2007/0006390 | A1 | 1/2007 | Clamen et al. |
| 2007/0009582 | A1 | 1/2007 | Madsen et al. |
| 2007/0027281 | A1 | 2/2007 | Michl et al. |
| 2007/0184740 | A1 | 8/2007 | Keller et al. |
| 2008/0108741 | A1 | 5/2008 | Van Herwijnen |
| 2009/0301972 | A1 | 12/2009 | Hines et al. |
| 2009/0324915 | A1 | 12/2009 | Swift et al. |
| 2010/0320113 | A1 | 12/2010 | Swift |
| 2011/0190425 | A1 | 8/2011 | Swift |

FOREIGN PATENT DOCUMENTS

| | | |
|---|---|---|
| CA | 2037214 A1 | 9/1991 |
| DE | 4308089 A1 | 9/1994 |
| EP | 0 044 614 A2 | 1/1982 |
| EP | 0911361 A1 | 1/1993 |
| EP | 0 547 819 | 6/1993 |
| EP | 0 583 086 | 2/1994 |
| EP | 0 672 720 | 9/1995 |
| EP | 0 714 754 | 6/1996 |
| EP | 0 826 710 | 4/1998 |
| EP | 0 873 976 | 10/1998 |
| EP | 1382642 A1 | 12/1998 |
| EP | 0 911 361 | 4/1999 |
| EP | 0 990 729 | 4/2000 |
| EP | 1 038 433 | 9/2000 |
| EP | 1 193 288 | 4/2002 |
| EP | 1 382 642 | 1/2004 |
| EP | 1486547 A2 | 6/2004 |
| EP | 1 486 547 | 12/2004 |
| FR | 2 614 388 | 10/1988 |
| FR | 2614388 A1 | 10/1988 |
| GB | 809645 | 3/1959 |
| GB | 1391172 | 4/1975 |
| GB | 1512066 | 5/1978 |
| GB | 2047258 A | 11/1980 |
| GB | 2 078 805 | 1/1982 |
| JP | 57-101100 | 6/1982 |
| JP | 2002-293576 | 9/2002 |
| JP | 2004-60058 | 2/2004 |
| SU | 374400 | 3/1973 |
| WO | 9936368 A1 | 7/1999 |
| WO | 99/47765 | 9/1999 |
| WO | 00/62628 | 10/2000 |
| WO | 03/071879 | 9/2003 |
| WO | 03106561 A1 | 12/2003 |
| WO | 2004/076734 | 9/2004 |
| WO | 2006/044302 | 4/2006 |
| WO | 2006044302 A1 | 4/2006 |
| WO | WO2007/014236 | 2/2007 |
| WO | 2011138459 A1 | 11/2011 |

OTHER PUBLICATIONS

English Translation of Japanese Abstract for 58011193, Jan. 21, 1983, 1 page.
English Translation of Japanese Abstract for 03173680, Jul. 26, 1991, 1 page.
English Translation of Japanese Abstract for 07034023, Feb. 3, 1995, 1 page.
English Translation of Russian Abstract for 374400, Mar. 20, 1973, 1 page.
Ames, J. M., "The Maillard Browning Reaction—an Update", Chemistry & Industry, No. 17, 1988, 4 pages.
"Gamma-aminopropyltrimethoxysilane", Hawley's Condensed Chemical Dictionary, 14th Edition, John Wiley & Sons, Inc., 2002, 1 page.
Dow Corning, A Guide to Silane Solutions, Copyright 2005 brochure, 30 pages, Form No. 26-132801.
Guy Clamen et al, Acrylic Thermosets: A Safe Alternative to Formaldehyde Resins, Nonwovens World Apr.-May 2004, 7 pages.
Knauf Insulation, Amber Blanket Insulation brochure, undated, 4 pages.

Kwasi Agyei-Aye et al., The role of the anion in the reaction of reducing sugars with ammonium salts, Carbohydrate Research 337 (2002) 2273-2277, Accepted for publication Jul. 19, 2002, 5 pages.
Johan Bjorksten et al., Polyester Resin-Glass Fiber Laminates, Industrial and Engineering Chemistry, vol. 46, No. 8, 1632-1634, Accepted for publication Jun. 5, 1954, 3 pages.
Non-final Office Action issued Sep. 7, 2012 by the USPTO from re-examination of U.S. Patent No. 7,888,445.
Response filed Nov. 7, 2012 by Patent Owner in response to Non-final Office Action issued Sep. 7, 2012 by the USPTO from re-examination of U.S. Patent No. 7,888,445.
Non-final Office Action issued Sep. 7, 2012 by the USPTO from re-examination of U.S. Patent No. 7,807,771.
Response filed Nov. 7, 2012 by Patent Owner in response to Non-final Office Action issued Sep. 7, 2012 by the USPTO from re-examination of U.S. Patent No. 7,807,771.
Non-final Office Action issued Sep. 19, 2012 by the USPTO from re-examination of U.S. Patent No. 7,854,980.
Response filed Nov. 19, 2012 by Patent Owner in response to Non-final Office Action issued Sep. 19, 2012 by the USPTO from re-examination of U.S. Patent No. 7,854,980.
Non-final Office Action issued Sep. 25, 2012 by the USPTO from re-examination of U.S. Patent No. 7,772,347.
Response filed Nov. 26, 2012 by Patent Owner in response to Non-final Office Action issued Sep. 25, 2012 by the USPTO from re-examination of U.S. Patent No. 7,772,347.
95000672—Third Party Reexam Request = Third Party Request for Inter Partes Reexamination of U.S. Patent No. 7,888,445 filed Jun. 30, 2012.
95000672—Exhibit A Reexam Request = Exhibit A submitted with Third Party Request for Inter Partes Reexamination of U.S. Patent No. 7,888,445.
95000672—Exhibit B Reexam Request = Exhibit B submitted with Third Party Request for Inter Partes Reexamination of U.S. Patent No. 7,888,445.
95000672—Third Party Reply = Third Party Comments filed Dec. 7, 2012 After Patent Owner Response to Non-final Office Action issued by the USPTO from re-examination of U.S. Patent No. 7,888,445.
95000673—Third Party Reexam Request = Third Party Request for Inter Partes Reexamination of U.S. Patent No. 7,807,771 filed Jun. 30, 2012.
95000673—Exhibit A Reexam Request = Exhibit A submitted with Third Party Request for Inter Partes Reexamination of U.S. Patent No. 7,807,771.
95000673—Exhibit B Reexam Request = Exhibit B submitted with Third Party Request for Inter Partes Reexamination of U.S. Patent No. 7,807,771.
95000673—Third Party Reply = Third Party Comments filed Dec. 7, 2012 After Patent Owner Response to Non-final Office Action issued by the USPTO from re-examination of U.S. Patent No. 7,807,771.
95000674—Third Party Reexam Request = Third Party Request for Inter Partes Reexamination of U.S. Patent No. 7,854,980 filed Jun. 30, 2012.
95000674—Exhibit A Reexam Request = Exhibit A submitted with Third Party Request for Inter Partes Reexamination of U.S. Patent No. 7,854,980.
95000674—Exhibit B Reexam Request = Exhibit B submitted with Third Party Request for Inter Partes Reexamination of U.S. Patent No. 7,854,980.
95000674—Third Party Reply = Third Party Comments filed Dec. 19, 2012 After Patent Owner Response to Non-final Office Action issued by the USPTO from re-examination of U.S. Patent No. 7,854,980.
95000675—Third Party Reexam Request = Third Party Request for Inter Partes Reexamination of U.S. Patent No. 7,772,347 filed Jun. 30, 2012.
95000675—Exhibit a Reexam Request = Exhibit a submitted with Third Party Request for Inter Partes Reexamination of U.S. Patent No. 7,772,347.
95000675—Exhibit B Reexam Request = Exhibit B submitted with Third Party Request for Inter Partes Reexamination of U.S. Patent No. 7,772,347.
95000675—Third Party Reply = Third Party Comments filed Dec. 19, 2012 After Patent Owner Response to Non-final Office Action issued by the USPTO from re-examination of U.S. Patent No. 7,772,347.

* cited by examiner

COMPOSITE WOOD BOARD

CROSS-REFERENCE TO RELATED APPLICATIONS

This application is a U.S. national counterpart application of international application serial no. PCT/EP2007/050746 filed Jan. 25, 2007.

FIELD OF THE INVENTION

This invention relates to composite wood boards, for example particle boards, orientated strand boards and wood fibre boards, and particularly to composite wood board comprising a bioresin and/or having a low formaldehyde or formaldehyde free binder.

BACKGROUND

Bioresin is a term coined to describe a resin or resin formulation derived from a biological source. Thus, many traditional resins such as protein-based soybean, collagen or casein, or carbohydrate-derivatives from cellulose or starch, natural rubber based adhesives and natural phenolic adhesives such as tannin or lignin may all be classed as bioresins. They are renewable polymers and, with low environmental impact, represent an alternative to existing petroleum-driven systems.

Interest in bio-resin systems stems largely from increasing regulation and public concern for a pollution-free environment, and the need for sustainable alternatives to products based upon a finite petrochemical resource. Commercial thermoset resin production and use is subject to such regulation largely due to the monomer components that form the basis of the formulation. Overwhelmingly, these resins are based on melamine, phenol, urea, formaldehyde, styrene or isocyanate starting materials.

Emissions of formaldehyde, phenol and isocyanate are generally regulated; they are governed in England and Wales under the Pollution Prevention and Control Regulations (2000), SI19, for installations involved in the manufacture of particleboard (PB), oriented strandboard (OSB), medium density fibreboard (MDF) and wood fibreboard. Emissions to air are limited to 5 $mg/m^3$. In particular, the guidance notes that 'operators should use resins which minimise emissions of formaldehyde wherever possible. The choice of resins used should be continually reviewed to ensure minimum emissions occur. Problems may exist concerning both high formaldehyde levels in the workplace and with the slow release of formaldehyde from the panel products themselves, particularly at the beginning of the product's lifetime.

Bioresin products may offer an alternative, renewable source of thermosetting resins that will begin to address the depletion of finite resources and have better emissions profiles, particularly when formulated without formaldehyde. Though formaldehyde-free materials such as siisocyanate and tannin resins have become available, about 85% of MDF produced today uses formaldehyde resin, corresponding to a European market of approximately 2 million tonnes per annum. In those resins, whilst a reduction in formaldehyde content has been achieved in recent years, it has been at the cost of longer processing times, and decreases in internal bond and bending strengths and an increase in swelling and water absorption of panel products made therefrom. There is, thus, a clear place in the market now for new more environmentally friendly resins that are competitive in price, performance and adaptable to existing composite manufacturing processes.

SUMMARY

According to one aspect, the present invention provide a composite wood board as defined in claim 1. Other aspects are defined in other independent claims. Preferred and/or alternative features are defined in the dependent claims.

DETAILED DESCRIPTION

The composite wood board is preferably an industrially manufactured composite wood board, as opposed to a laboratory test manufactured wood board. The composite wood board may have dimensions of at least 30 cm×30 cm; it may have dimensions of at least 50 cm×80 cm, possibly at least 1 m×2 m.

The composite wood board may have edges which are trimmed and/or cut and/or machined.

The composite wood board may be provided as a package comprises a plurality or wood boards arranged and/or bound together, for example to facilitate transport; it may comprise an enveloping film, for example of a plastics material. The package may comprise a pallet; it may be adapted by handling by mechanical lifting equipment and/or a fork lift truck.

The composite board may have a nominal thickness of at least 11 mm, at least 12 mm or at least 15 mm.

The curing time of the composite wood board is preferably less than 25 minutes.

The binder may:
- be based on a reducing sugar; and/or
- be based on reductosis; and/or
- be based on an aldehyde containing sugars/and/or
- include at least one reaction product of a carbohydrate reactant and an amine reactant; and/or
- include at least one reaction product of a reducing sugar and an amine reactant; and/or
- include at least one reaction product of a carbohydrate reactant and a polycarboxylic acid ammonium salt reactant; and/or
- include at least one reaction product from a Maillard reaction.

Non-limiting examples of laboratory scale tests relating to the invention are described below with reference to the accompanying drawings of which:

EXAMPLE 1a

Figure 1:
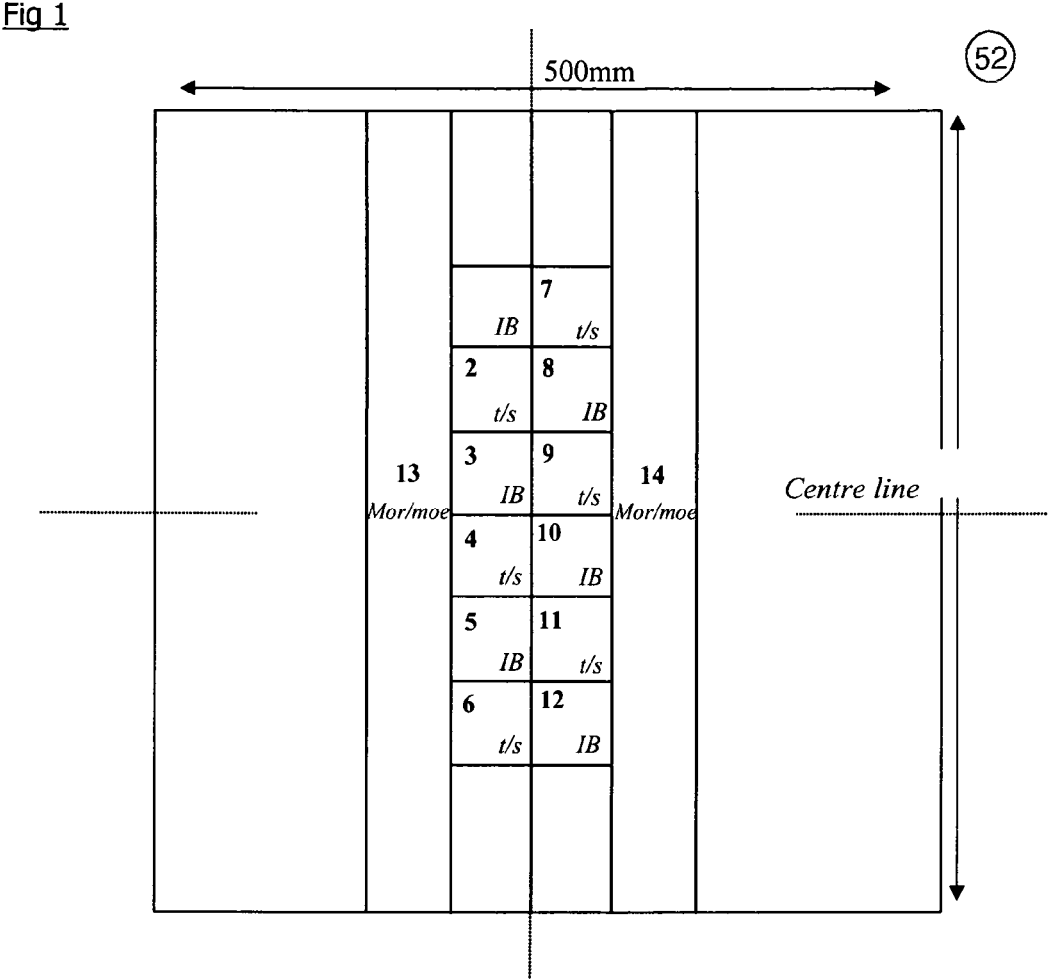
FIG. 1 shows the cutting pattern for boards in Example 2

Preparation of Ammonium Polycarboxylate-Sugar Binders Used to Construct Wood Fiber Board Compositions Aqueous triammonium citrate-dextrose (1:6) binders were prepared by the following general procedure: Powdered dextrose monohydrate (915 g) and powdered anhydrous citric acid (152.5 g) were combined in a 1-gallon reaction vessel to which 880 g of distilled water was added. To this mixture were added 265 g of 19% aqueous ammonia with agitation, and agitation was continued for several minutes to achieve complete dissolution of solids. To the resulting solution were added 3.3 g of SILQUEST A-1101 silane to produce a pH ~8-9 solution (using pH paper), which solution contained approximately 50% dissolved dextrose monohydrate and dissolved ammonium citrate solids (as a percentage of total weight of solution); a 2-g sample of this solution, upon thermal curing at 400° F. for 30 minutes, would yield 30% solids (the weight loss being attributed to dehydration during thermoset binder formation). Where a silane other than SILQUEST A-1101 was included in the triammonium citrate-dextrose (1:6) binder, substitutions were made with SILQUEST A-187 Silane, HYDROSIL 2627 Silane, or Z-6020 Silane. When additives were included in the triammonium citrate-dextrose (1:6) binder to produce binder variants, the standard solution was distributed among bottles in 300-g aliquots to which individual additives were then supplied.

Figure 2:
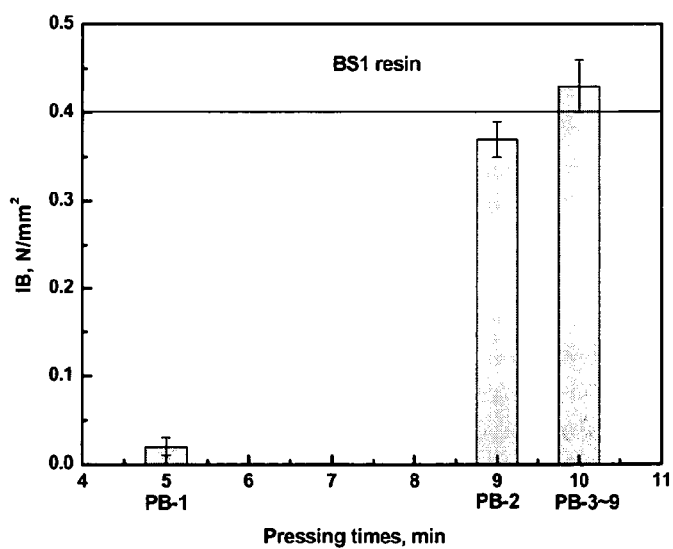
FIG. 2 shows the effects of pressing times on IB for particle boards with BS1 resin in Example 2

The FT-IR spectrum of a dried (uncured) triammonium citrate-dextrose (1:6) binder, which spectrum was obtained as a microscopic thin film from a 10-g sample of a 30% (dissolved binder solids) binder dried in vacuo, is shown in FIG. 1. The FT-IR spectrum of a cured triammonium citrate-dextrose (1:6) Maillard binder, which spectrum was obtained as a microscopic thin film from a 10-g sample of a 30% binder (dissolved binder solids) after curing, is shown in FIG. 2. When polycarboxylic acids other than citric acid, sugars other than dextrose, and/or additives were used to prepare aqueous ammonium polycarboxylate sugar binder variants, the same general procedure was used as that described above for preparation of an aqueous triammonium citrate-dextrose (1:6) binder. For ammonium polycarboxylate-sugar binder variants, adjustments were made as necessary to accommodate the inclusion of, for example, a dicarboxylic acid or a polymeric polycarboxylic acid instead of citric acid, or to accommodate the inclusion of, for example, a triose instead of dextrose, or to accommodate the inclusion of, for example, one or more additives. Such adjustments included, for example, adjusting the volume of aqueous ammonia necessary to generate the ammonium salt, adjusting the gram amounts of reactants necessary to achieve a desired molar ratio of ammonium polycarboxylate to sugar, and/or including an additive in a desired weight percent.

Several methods were used to produce wood fiber boards/sheets bonded with this triammonium citrate-dextrose (1:6) binder. A representative method, which method produced strong, uniform samples, is as follows: Wood in the form of assorted pine wood shavings and sawdust was purchased from a local farm supply store. Wood fiber board samples were made with the .as received wood and also material segregated into the shavings and sawdust components. Wood was first dried in an oven at approximately 200° F. over night, which drying resulted in moisture removal of 14-15% for the wood shavings and about 11% for the sawdust. Thereafter, dried wood was placed in an 8 inch high×12 inch wide×10.5 inch deep plastic container (approximate dimensions). Triammonium citrate-dextrose (1:6) binder was prepared (36% in binder solids) as described above, and then 160 g of binder was sprayed via an hydraulic nozzle onto a 400-g sample of wood in the plastic container while the container was inclined 30-40 degrees from the vertical and rotated slowly (approximately 5-15 rpm). During this treatment, the wood was gently tumbled while becoming uniformly coated.

Samples of resinated wood were placed in a collapsible frame and compressed in between heated platens under the following conditions: resinated wood shavings, 300 psi; resinated sawdust, 600 psi. For each resinated sample, the cure conditions were 350° F. for 25 to 30 minutes. The resulting sample boards were approximately 10 inches long×10 inches wide, and about 0.4 inches thick before trimming, well-bonded internally, smooth surfaced and made a clean cut when trimmed on the band saw. Trimmed sample density and the size of each trimmed sample board produced were as follows: sample board from wood shavings, density ~54 pcf, size ~8.3 inches long×9 inches wide×0.36 inches thick; sample board from sawdust, density ~44 pcf, size ~8.7 inches long×8.8 inches wide×0.41 inches thick. The estimated binder content of each sample board was ~12.6%.

EXAMPLE 1b

The following samples were tested to compare the Flexural and Tensile strength of standard particle board and oriented strand board with similar products made using a new test binder:

Commercially available ½ in. particle board purchased from Builders Lumber

Commercially available ½ in. oriented strand board (OSB) purchased from Builders Lumber Test wood particle board made as described above 8.75× 8.87×0.414 371.9 gm. 44.1 lbs³ 12.6% binder Test wood shavings board made as described above 8.37× 9×0.336 361.2 gm. 54.4 lbs³ 12.6% binder The test boards were each approximately 8¾ inches square. The boards from builders were approximately 2 ft×4 ft when purchased. These boards were cut down to approximately 8¾ inches square so that the samples would be collected consistently from the various products.

The test results are set out in tables 1 to 5:

TABLE 1

Summary results

| | Tensile Strength | | | | Flexural Strength | | | |
|---|---|---|---|---|---|---|---|---|
| | Thickness In. | Density Lb/ft³ | Max Load lbs | Tensile Strength psi | Thickness In. | Density Lb/ft³ | Load @ Break lbs | Modulus psi |
| Particle Board (store bought) | 0.521 | 41.36 | 296.95 | 760.70 | 0.520 | 45.81 | 76.26 | 325295.1 |

TABLE 1-continued

Summary results

| | Tensile Strength | | | | Flexural Strength | | | |
| --- | --- | --- | --- | --- | --- | --- | --- | --- |
| | Thickness In. | Density Lb/ft$^3$ | Max Load lbs | Tensile Strength psi | Thickness In. | Density Lb/ft$^3$ | Load @ Break lbs | Modulus psi |
| Test - Particle Board | 0.416 | 42.82 | 270.55 | 868.44 | 0.445 | 45.05 | 61.38 | 281499.6 |
| Oriented Strand Board (store bought) | 0.463 | 36.66 | 293.92 | 848.92 | 0.495 | 37.05 | 87.82 | 293246.4 |
| Test - Oriented Strand Board | 0.331 | 51.64 | 274.20 | 1124.94 | 0.386 | 50.67 | 77.02 | 322299.0 |

TABLE 2

Detail Data - Standard Particle Board (store bought)

| | Tensile Strength | | | | Flexural Strength | | | |
| --- | --- | --- | --- | --- | --- | --- | --- | --- |
| Particle Board | Thickness In. | Density Lb/ft$^3$ | Max Load lbs | Tensile Strength psi | Thickness In. | Density Lb/ft$^3$ | Load @ Break lbs | Modulus psi |
| 1 | 0.520 | 41.45 | 307.63 | 788.80 | 0.523 | 46.68 | 78.45 | 301254.6 |
| 2 | 0.521 | 41.35 | 286.26 | 732.60 | 0.521 | 46.93 | 78.95 | 313865.3 |
| 3 | | | | | 0.520 | 46.64 | 73.80 | 314028.9 |
| 4 | | | | | 0.522 | 45.04 | 71.87 | 335869.0 |
| 5 | | | | | 0.518 | 44.47 | 76.23 | 340901.5 |
| 6 | | | | | 0.516 | 45.08 | 78.24 | 345851.6 |

TABLE 3

Detail Data - Test Particle Board

| | Tensile Strength | | | | Flexural Strength | | | |
| --- | --- | --- | --- | --- | --- | --- | --- | --- |
| Test Particle Board | Thickness In. | Density Lb/ft$^3$ | Max Load lbs | Tensile Strength psi | Thickness In. | Density Lb/ft$^3$ | Load @ Break lbs | Modulus psi |
| 1 | 0.416 | 40.99 | 204.30 | 654.82 | 0.418 | 51.02 | 75.88 | 316852.8 |
| 2 | 0.415 | 44.76 | 336.79 | 1082.06 | 0.431 | 49.89 | 72.45 | 329690.9 |
| 3 | | | | | 0.441 | 41.72 | 56.33 | 247006.3 |
| 4 | | | | | 0.450 | 47.66 | 68.94 | 348970.7 |
| 5 | | | | | 0.463 | 44.37 | 59.02 | 281044.9 |
| 6 | | | | | 0.468 | 35.62 | 35.62 | 165431.8 |

TABLE 4

Detail Data - Standard Oriented Strand Board (store bought)

| | Tensile Strength | | | | Flexural Strength | | | |
| --- | --- | --- | --- | --- | --- | --- | --- | --- |
| Oriented Strand Board | Thickness In. | Density Lb/ft$^3$ | Max Load lbs | Tensile Strength psi | Thickness In. | Density Lb/ft$^3$ | Load @ Break lbs | Modulus psi |
| 1 | 0.468 | 36.47 | 250.98 | 715.03 | 0.475 | 38.67 | 41.02 | 177706.4 |
| 2 | 0.457 | 36.91 | 336.86 | 982.81 | 0.512 | 36.03 | 79.96 | 230090.1 |
| 3 | | | | | 0.495 | 36.57 | 52.95 | 198956.0 |
| 4 | | | | | 0.491 | 37.88 | 126.31 | 412893.2 |
| 5 | | | | | 0.495 | 36.45 | 115.87 | 375834.9 |
| 6 | | | | | 0.500 | 36.68 | 110.82 | 363997.5 |

TABLE 5

Detail Data - Test Oriented Strand Board

| Test Oriented Strand Board | Tensile Strength | | | | Flexural Strength | | | |
|---|---|---|---|---|---|---|---|---|
| | Thickness In. | Density Lb/ft³ | Max Load lbs | Tensile Strength psi | Thickness In. | Density Lb/ft³ | Load @ Break lbs | Modulus psi |
| 1 | 0.317 | 54.39 | 382.26 | 1607.84 | 0.351 | 56.57 | 53.61 | 241391.0 |
| 2 | 0.345 | 49.10 | 166.13 | 642.04 | 0.380 | 54.20 | 78.17 | 363683.1 |
| 3 | | | | | 0.400 | 51.12 | 81.74 | 365485.3 |
| 4 | | | | | 0.384 | 53.08 | 91.70 | 402491.0 |
| 5 | | | | | 0.400 | 46.72 | 89.90 | 338210.5 |
| 6 | | | | | 0.400 | 42.34 | 67.00 | 222533.0 |

EXAMPLE 2

Two experimental resins were used, BS1 and BS1-SOK (solids content of 50%). Particle boards (PB), oriented strand boards (OSB) and medium density fibreboards (MDF) were manufactured with those two resin systems.

Manufacture of Test Particle Boards:

Single layer particleboards were manufactured. Wood chips for the manufacture of the particleboards were for commercial particleboard manufacture, these chips would have consisted of a mixture of wood species and was thought to consist mainly of recycled timber. Prior to use the chips were sieved to remove oversize material and shives. Before resination, the chips were dried to constant moisture content (MC). Hereinafter, moisture content will be expressed as the weight of water contained in wood as a percentage of the oven dry weight of wood.

12% or 14% resin was added to the wood chips (weight of resin solids to weight of dry wood). The resin and chips were blended together in a Kenwood or Drum blender. The dry chip moisture content and the moisture content of the sprayed chips were all measured; the information is summarised in Table 6. The mass of chips per board was adjusted according to moisture content in order to achieve a target density of 650 kg/m³.

After blending the resin, additives and chips, the resultant "furnish" was transferred to a forming box and lightly compacted before being hot pressed for final consolidation and resin curing.

Boards were pressed using a target platen temperature of 220° C. and a total press time of 5-12 minutes. Panels were 500 mm by 500 mm or 300 mm by 300 mm square and 12 mm thick. On removal from the hot press the boards were labelled and after cooling the edges were trimmed.

Manufacture of Test Orientated Strand Boards:

The flakes are sifted and separated into core and surface flakes. Large size flakes are used in surface layers, small size in core layer.

The surface material is blended with 14% BS1 resin (resin to timber, dry basis) and water in two benders. Resin is mixed with water through a static mixer. Water is added to reduce the viscosity of the resin and increase the flake MC to 12%.

The core material is blended with 12% BS1 resin and water in a single bender. Target core flake MC is at 10-12%.

The blended material is conveyed to three forming stations, surface, core and surface. The surface formers align the flakes parallel to the machine direction, whilst the core former arranges the flakes perpendicular to the machine direction. Flake alignment is achieved by a series of paddles or rollers in the forming stations.

The boards information was shown in table 7. PB-1 to PB-11 were made with BS1 resin, PB12 to PB14 made with BS1-SOK resin.

TABLE 6

Particle boards information

| | Resin | | Moisture content, % | | Processing | | |
|---|---|---|---|---|---|---|---|
| | Type | Loading, % | Pre-blend | Post-blend | Temp, °C. | Time, min | Additives |
| PB-1 | BS1 | 12 | 3.22 | 12.1 | 220 | 5 | No |
| PB-2 | BS1 | 12 | 4.24 | 12.26 | 220 | 9 | No |
| PB-3 | BS1 | 12 | 3.22 | 12.1 | 220 | 10 | No |
| PB-4 | BS1 | 12 | 3.54 | 12.32 | 220 | 10 | No |
| PB-5 | BS1 | 12 | 3.54 | 12.32 | 220 | 10 | No |
| PB-6 | BS1 | 12 | 4.78 | 12.27 | 220 | 10 | No |
| PB-7 | BS1 | 12 | 3.36 | 12.25 | 220 | 10 | No |
| PB-8 | BS1 | 12 | 4.24 | 12.92 | 220 | 10 | No |
| PB-9 | BS1 | 12 | 4.24 | 12.92 | 220 | 10 | No |
| PB-10 | BS1 | 12 | 3.78 | 11.8 | 220 | 10 | Wax |
| PB-11 | BS1 | 14 | 3.22 | 12 | 220 | 10 | No |
| PB-12 | BS1-SOK | 12 | 3.68 | 15.68 | 220 | 5 | No |
| PB-13 | BS1-SOK | 12 | 3.68 | 14.44 | 220 | 9 | No |
| PB-14 | BS1-SOK | 12 | 3.47 | 12.86 | 220 | 10 | No |

TABLE 7

Oriented strand boards information

| | | Moisture content, % | | Processing | |
|---|---|---|---|---|---|
| | | Pre-blend | Post-blend | Temp, °C. | Time, min |
| OSB-1 | Surface | 4.84 | 12.1 | 220 | 9 |
| | Core | 5.39 | 11.65 | | |
| OSB-2 | Surface | 2.84 | 11.21 | 220 | 10 |
| | Core | 2.86 | 10.03 | | |
| OSB-3 | Surface | 3.71 | 12.04 | 220 | 12 |
| | Core | 3.56 | 11.37 | | |
| OSB-4 | Surface | 3.22 | 9.89 | 220 | 15 |
| | Core | 3.22 | 8.23 | | |

Manufacture of Test Medium Density Fibreboards:

A standard raw material was used: chipped softwood (primarily spruce) obtained from Kronospan.

12% BS1 resin was added to the MDF (weight of resin solids to weight of dry fibres). The MC before and post blend was 8.26 and 16.23%, respectively.

Boards were pressed using a target platen temperature of 220° C. and a total press time of 10 minutes.

Preparation of Samples for Testing:

After cooling each board was cut to a specified pattern, see FIG. 1 for details.

The sample size (from positions 1-12) was 50 mm by 50 mm squares, sample width from positions 13 and 14 was 50 mm.

From each board six samples (from positions 1, 3, 5, 8, 10 and 12) were tested for internal bond strength in accordance with EN319, six (from positions 2, 4, 6, 7, 9 and 11) for thickness swelling and water absorption with EN317. Two from positions 13 and 14 were tested for modulus of elasticity in bending and of bending strength according to EN310.

Testing:
Internal Bond Strength
   Transverse Internal Bond Strength. (EN 319 for PB and EN 300 for OSB)
Moisture Absorption & Thickness Swelling
   Thickness Swelling after 24 hrs in Water at 20° C. (EN 317)
   Water Absorption after 24 hrs in Water at 20° C.
Modulus of Elasticity in Bending and of Bending Strength.
   Modulus of elasticity (MOE), (EN 310)
   Bending strength (MOR)
Test Results for Particle Boards:

Table 8 summarises the results for internal bond strength (IB) of particle boards.

Figure 3:
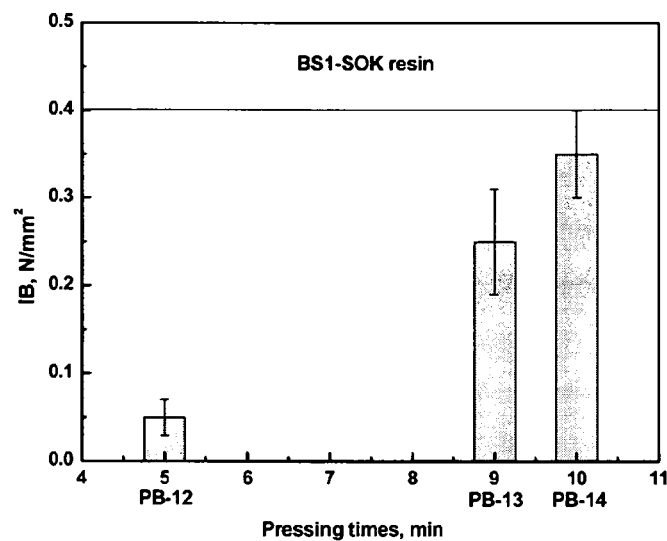
FIG. 3 shows the effects on pressing times on IB for particle boards with BS1-SOK resin in Example 2

FIGS. 2 and 3 show the effects of pressing times on IB. It was noted that PB-3 to PB-9 shared the same processing (temperature and times) and IB varied within error, so the average at 0.43 N/mm² with STD 0.03 was included in FIG. 2. The general requirement of 0.4 N/mm² for IB from standards was also indicated in FIGS. 2 and 3.

It was apparent that resins in PB-1 and PB-12 pressed for 5 min had developed no significant bond strengths due to insufficient press times, bond strengths were improved when increased the pressing times to 9 min (PB-2 and PB-13), bond strength over standard value was obtained for PB with BS1 resin (PB-3 to PB-9) when further increased the pressing times to 10 min. However, with BS1-SOK resin system, IB (PB14) was lower than the standard requirement.

For PB-10, Wax was added in, it seems there was no significant effects on IB.

IB for PB-11 which had a resin loading at 14%, 2% higher than the rest boards, was 0.5 N/mm². This suggested that the increase of resin loading will increase the bond strengths.

TABLE 8

Internal bond strength of panels

|  | Density, Kg/m3 | STD | IB, N/mm2 | STD |
|---|---|---|---|---|
| PB-1 | 552 | 22.2 | 0.02 | 0.01 |
| PB-2 | 598 | 18.75 | 0.37 | 0.02 |
| PB-3 | 565 | 12.9 | 0.46 | 0.02 |
| PB-4 | 617 | 10.5 | 0.46 | 0.03 |
| PB-5 | 592 | 8.3 | 0.44 | 0.02 |
| PB-6 | 591 | 6.9 | 0.43 | 0.04 |
| PB-7 | 610 | 15.8 | 0.41 | 0.05 |
| PB-8 | 615 | 23.4 | 0.46 | 0.04 |
| PB-9 | 613 | 39.4 | 0.40 | 0.07 |
| PB-10 | 630 | 20.6 | 0.47 | 0.05 |
| PB-11 | 617 | 6.04 | 0.5 | 0.03 |
| PB-12 | 638 | 37.6 | 0.05 | 0.02 |
| PB-13 | 627 | 8.9 | 0.25 | 0.06 |
| PB-14 | 567 | 12.1 | 0.35 | 0.05 |

Figure 4:
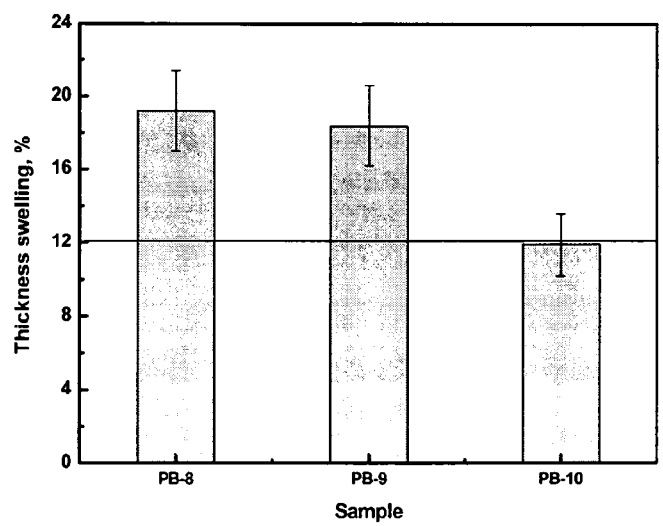
FIG. 4 shows thickness swelling after 24 hours at 20° C. in relation to Example 2
Figure 5:
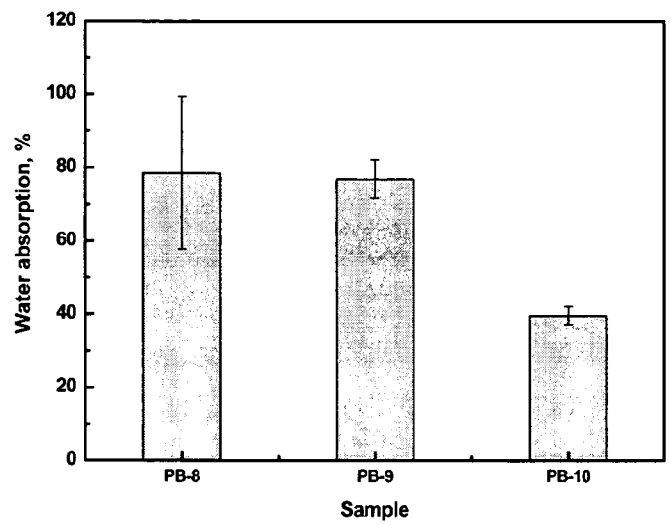
FIG. 5 shows water absorption swelling after 24 hours at 20° C. in relation to Example 2

The results of the tests for thickness swelling and water absorption are summarised in FIGS. 4 and 5.

PB-8, 9 and 10 were processed at same temperature and times, the only difference between PB-8, 9 and 10 was the addition of wax, 0.8% wax was added in PB-10.

Figure 6:
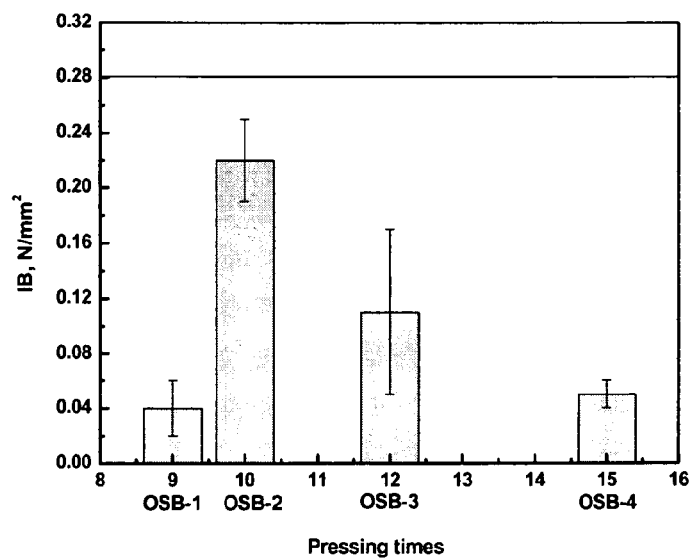
FIG. 6 shows effects of pressing times on IB for orientated strand board with BS1 resin in relation to Example 2

There were no significant difference on thickness swelling and water absorption between PB-8 and PB-9, both thickness swelling and water absorption were much higher than the requirement by standard, as indicated by solid line in FIG. 6. Significant difference were apparent in addition of wax, sample had the lowest thickness swelling and water absorption, which also was lower than the requirement by standard. This suggested that use of wax helped to improve thickness swelling and water absorption.

Modulus of Elasticity in Bending and of Bending Strength

Only the boards (PB-8 and PB-9) made at 220° C. for 10 min were tested for modulus of elasticity and bending strength. The average for MOE was 2314 N/mm² with STD of 257.68, which was much higher than the requirement by standard of 1800 N/mm². This means the board was much stiffer. Average for MOR was 10.4 N/mm², which was lower than the requirement of 14 N/mm². To improve MOR to match the requirement, increasing the resin loading may be the right way.

Results for Oriented Strand Boards (OSB)

FIG. 6 summarises the results for internal bond of oriented strand board, the solid line indicated the requirement of 0.28 N/mm² by standard (EN300) for OSB.

IB was always lower than the requirement; to improve the bond strength for OSB boards with BS1 resin, the processing parameters and/or the resin loading should be considered.

Modulus of Elasticity in Bending and of Bending Strength

Boards OSB-2 and OSB-3 were tested for mor and moe, the results are summarized in table 9. The requirements by standard were 18 N/mm² and 2500 N/mm². Both OSB-2 and OSB-3 had much higher mor and moe than the requirements for general purpose boards, though the IB was lower. Not only the bonding strength between fibres and resin but also the fibre dimension and orientation would be of benefit to mor and moe.

The current values also were greater than the requirements for load bearing boards for use in both dry and humid conditions which are 20 N/mm² and 3500 N/mm², however, lower than the requirement for heavy duty load bearing boards 28 N/mm² and 4800 N/mm².

TABLE 9

Mor and moe results for OSB

|  | MOR, N/mm² | STD | MOE, N/mm² | STD |
|---|---|---|---|---|
| OSB-2 | 26.47 | 4.11 | 4158.0 | 564.58 |
| OSB-3 | 24.89 | 2.42 | 3861.9 | 428.73 |

Results for Medium Density Board
Internal Bond Strength

Only one trial of medium density board was manifested. The pressing temperature was 220° C. and times 10 min. The average of IB was 0.43 N/mm² with STD at 0.03, which was higher than the requirement of 0.4 N/mm² by standard.

Modulus of Elasticity in Bending and of Bending Strength

The average for MOR was 22.26 N/mm² with STD of 1.31, which was 60% higher than the requirement by standard of 14 N/mm². Average for MOE was 2771.62 N/mm² STD 204.17 which was over 50% greater than the requirement of 1800 N/mm².

Note that 14 N/mm² and 1800 N/mm² are the requirement for general purpose boards of use in dry condition. The requirements for load-bearing boards of use in dry or humid conditions are 18 N/mm² and 2500 N/mm², IB of 0.45 N/mm². The current mor and moe were greater than this requirements as well though IB was slighter lower. However, with the optimisation of processing, MDF must achieve all the requirements for load-bearing boards or even for heavy duty load bearing ones.

Discussion of Results from Example 2:

The pressing times and resin loading played an important role in IB of particle boards made with BS1 resin, IB increased with the increase of pressing times and resin loading. However, for particle boards made with BS1-SOK resin, IB varied with the increase of pressing time, and which was always lower than the requirement by standard. Optimisation of process parameters would be expected to lead to improvements.

Thickness swelling and water absorption was improved by the addition of wax in particle board, the values were lower than the requirement by standard. Optimisation should bring improvements.

Oriented strand boards made by BS1 resin had lower IB but higher mor and moe than the requirements by standards. IB strongly depended on the bonding strength between fibres and matrix, however, mor and moe would be benefited from the fibre dimension and orientation.

By using BS1 resin, medium density fibre boards showed greater mechanical properties than the requirements of general purposes boards, with possibility to achieve the requirements for load-bearing boards by optimising the processing.

The problem for oriented strand boards with BS1 resin is lower IB, to improve this, increasing resin loading may be the right way forward.

Medium density boards with BS1 resin showed great performance; optimisation of the processing may meet the requirements for load-bearing boards or even heavy duty load bearing boards.

Whilst particular binders have been used in the examples, other binders particularly binders which are discussed below, may be used in the context of the invention.

Discussion of Binders:

Cured or uncured binders useful in connection with the present invention may comprise one or more of the following features or combinations thereof. In addition, materials in accordance with the present invention may comprise one or more of the following features or combinations thereof:

Initially it should be appreciated that the binders may be utilized in a variety of fabrication applications to produce or promote cohesion in a collection of non or loosely assembled matter. A collection includes two or more components. The binders produce or promote cohesion in at least two of the components of the collection. For example, subject binders are capable of holding a collection of matter together such that the matter adheres in a manner to resist separation. The binders described herein can be utilized in the fabrication of any material.

One potential feature of the present binders is that they are formaldehyde free. Accordingly, the materials the binders are disposed upon may also be formaldehyde free. In addition, the present binders may have a reduced trimethylamine content as compared to other known binders. With respect to the present binder's chemical constituents, they may include ester and/or polyester compounds. The binders may include ester and/or polyester compounds in combination with a vegetable oil, such as soybean oil. Furthermore, the binders may include ester and/or polyester compounds in combination with sodium salts of organic acids. The binders may include sodium salts of inorganic acids. The binders may also include potassium salts of organic acids. Moreover, the binders may include potassium salts of inorganic acids. The described binders may include ester and/or polyester compounds in combination with a clay additive, such as montmorillonite.

Figure 8:
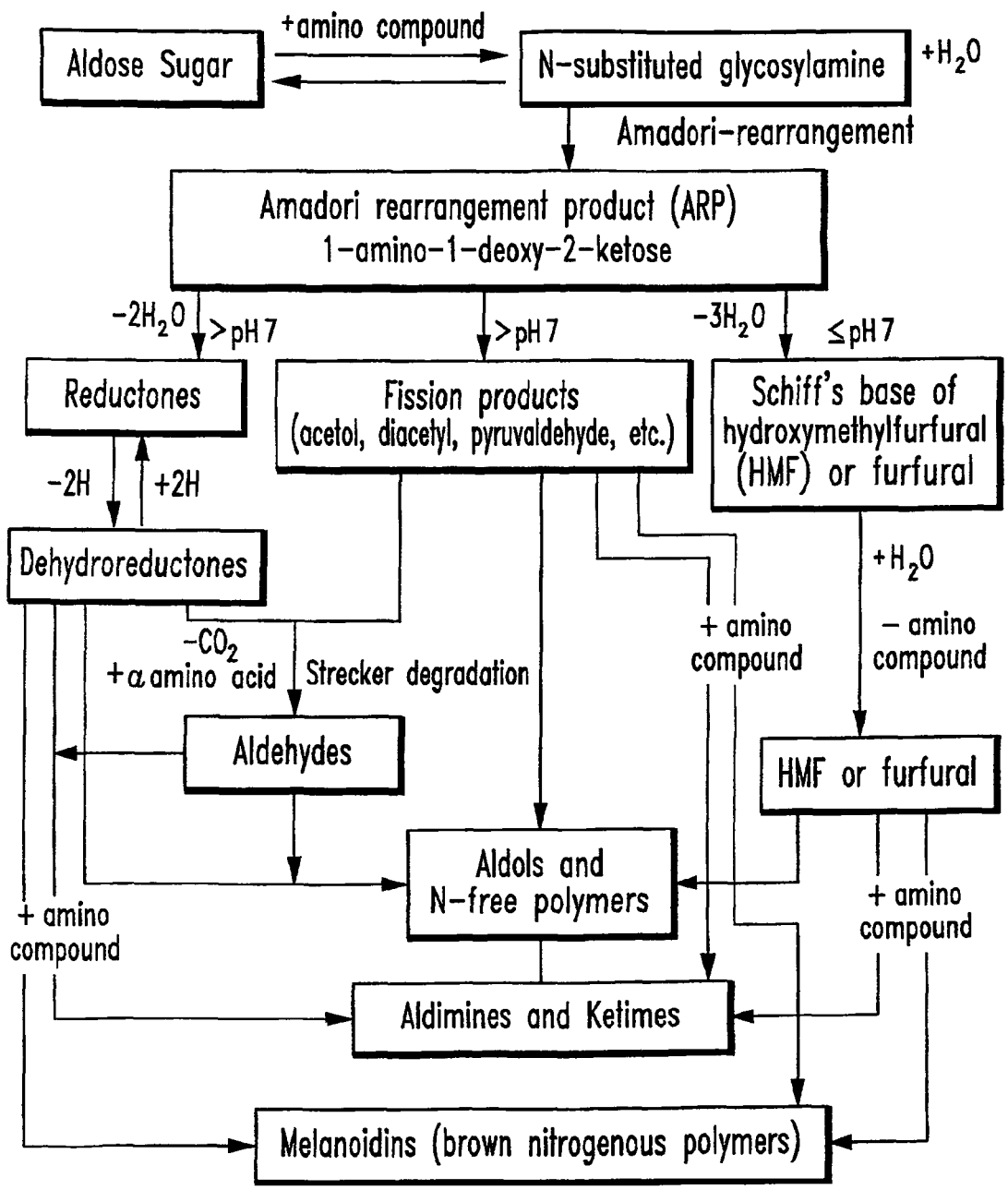
FIG. 8 illustrates a Maillard reaction schematic when reacting a reducing sugar with an amino compound.

Furthermore, the binders of the present invention may include a product of a Maillard reaction. For example, see FIG. 8. As shown in FIG. 8, Maillard reactions produce melanoidins, i.e., high molecular weight, furan ring and nitrogen-containing polymers that vary in structure depending on the reactants and conditions of their preparation. Melanoidins display a C:N ratio, degree of unsaturation, and chemical aromaticity that increase with temperature and time of heating. (See, Ames, J. M. in .The Maillard Browning Reaction—an update, Chemistry and Industry (Great Britain), 1988, 7, 558-561, the disclosure of which is hereby incorporated herein by reference). Accordingly, the subject binders may be made via a Maillard reaction and thus contain melanoidins. It should be appreciated that the subject binders may contain melanoidins, or other Maillard reaction products, which products are generated by a separate process and then simply added to the composition that makes up the binder. The melanoidins in the binder may be water insoluble. Moreover, the binders may be thermoset binders.

The Maillard reactants to produce a melanoidin may include an amine reactant reacted with a reducing-sugar carbohydrate reactant. For example, an ammonium salt of a monomeric polycarboxylic acid may be reacted with (i) a monosaccharide in its aldose or ketose form or (ii) a polysaccharide or (iii) with combinations thereof. In another variation, an ammonium salt of a polymeric polycarboxylic acid may be contacted with (i) a monosaccharide in its aldose or ketose form or (ii) a polysaccharide, or (iii) with combinations thereof. In yet another variation, an amino acid may be contacted with (i) a monosaccharide in its aldose or ketose form, or (ii) with a polysaccharide or (iii) with combinations thereof. Furthermore, a peptide may be contacted with (i) a monosaccharide in its aldose or ketose form or (ii) with a polysaccharide or (iii) with combinations thereof. Moreover, a protein may be contacted with (i) a monosaccharide in its aldose or ketose form or (ii) with a polysaccharide or (iii) with combinations thereof.

It should also be appreciated that the binders may include melanoidins produced in non-sugar variants of Maillard reactions. In these reactions an amine reactant is contacted with a non-carbohydrate carbonyl reactant. In one illustrative variation, an ammonium salt of a monomeric polycarboxylic acid is contacted with a non-carbohydrate carbonyl reactant such as, pyruvaldehyde, acetaldehyde, crotonaldehyde, 2-furaldehyde, quinone, ascorbic acid, or the like, or with combinations thereof. In another variation, an ammonium salt of a polymeric polycarboxylic acid may be contacted with a non-carbohydrate carbonyl reactant such as, pyruvaldehyde, acetaldehyde, crotonaldehyde, 2-furaldehyde, quinone, ascorbic acid, or the like, or with combinations thereof. In yet another illustrative variation, an amino acid may be contacted with a non-carbohydrate carbonyl reactant such as, pyruvaldehyde, acetaldehyde, crotonaldehyde, 2-furaldehyde, quinone, ascorbic acid, or the like, or with combinations thereof. In another illustrative variation, a peptide may be contacted with a non-carbohydrate carbonyl reactant such as, pyruvaldehyde, acetaldehyde, crotonaldehyde, 2-furaldehyde, quinone, ascorbic acid, or the like, or with combinations thereof. In still another illustrative variation, a protein may contacted with a non-carbohydrate carbonyl reactant such as, pyruvaldehyde, acetaldehyde, crotonaldehyde, 2-furaldehyde, quinone, ascorbic acid, and the like, or with combinations thereof.

The melanoidins discussed herein may be generated from melanoidin reactant compounds. These reactant compounds are disposed in an aqueous solution at an alkaline pH and therefore are not corrosive. That is, the alkaline solution prevents or inhibits the eating or wearing away of a substance, such as metal, caused by chemical decomposition brought about by, for example, an acid. The reactant compounds may include a reducing-sugar carbohydrate reactant and an amine reactant. In addition, the reactant compounds may include a non-carbohydrate carbonyl reactant and an amine reactant.

It should also be understood that the binders described herein may be made from melanoidin reactant compounds themselves. That is, once the Maillard reactants are mixed, this mixture can function as a binder of the present invention. These binders may be utilized to fabricate uncured, formaldehyde-free matter, such as fibrous materials.

In the alternative, a binder made from the reactants of a Maillard reaction may be cured. These binders may be used to fabricate cured formaldehyde free matter, such as, fibrous compositions. These compositions are water-resistant and, as indicated above, include water-insoluble melanoidins.

It should be appreciated that the binders described herein may be used in manufacturing products from a collection of non or loosely assembled matter. For example, these binders may be employed to fabricate fiber products. In one illustrative embodiment, the binders are used to make cellulosic compositions. With respect to cellulosic compositions, the binders may be used to bind cellulosic matter to fabricate, for example, wood fiber board which has desirable physical properties (e.g., mechanical strength).

One embodiment of the invention is directed to a method for manufacturing products from a collection of non- or loosely assembled matter. The method may include contacting the fibers with a thermally-curable, aqueous binder. The binder may include (i) an ammonium salt of a polycarboxylic acid reactant and (ii) a reducing-sugar carbohydrate reactant. These two reactants are melanoidin reactants (i.e., these reactants produce melanoidins when reacted under conditions to initiate a Maillard reaction.) The method can further include removing water from the binder in contact with the fibers (i.e., the binder is dehydrated). The method can also include curing the binder in contact with the fibers (e.g., thermally curing the binder).

An example of utilizing this method is in the fabrication of cellulosic materials. The method may include contacting the cellulosic material (e.g., cellulose fibers) with a thermally-curable, aqueous binder. The binder may include (i) an ammonium salt of a polycarboxylic acid reactant and (ii) a reducing-sugar carbohydrate reactant. As indicated above, these two reactants are melanoidin reactant compounds. The method can also include removing water from the binder in contact with the cellulosic material. As before, the method can also include curing the binder (e.g., thermal curing).

A fibrous product is described that includes a binder in contact with cellulose fibers, such as those in a mat of wood shavings or sawdust. The mat may be processed to form one of several types of wood fiber board products. In one variation, the binder is uncured. In this variation, the uncured binder may function to hold the cellulosic fibers together. In the alternative, the cured binder may function to hold the cellulosic fibers together.

As used herein, the phrase .formaldehyde-free. means that a binder or a material that incorporates a binder liberates less than about 1 ppm formaldehyde as a result of drying and/or curing. The 1 ppm is based on the weight of sample being measured for formaldehyde release.

Cured indicates that the binder has been exposed to conditions to so as to initiate a chemical change. Examples of these chemical changes include, but are not limited to, (i) covalent bonding, (ii) hydrogen bonding of binder components, and chemically cross-linking the polymers and/or oligomers in the binder. These changes may increase the binder's durability and solvent resistance as compared to the uncured binder. Curing a binder may result in the formation of a thermoset material. Furthermore, curing may include the generation of melanoidins. These melanoidins may be generated from a Maillard reaction from melanoidin reactant compounds. In addition, a cured binder may result in an increase in adhesion between the matter in a collection as compared to an uncured binder. Curing can be initiated by, for example, heat, electromagnetic radiation or, electron beams.

In a situation where the chemical change in the binder results in the release of water, e.g., polymerization and cross-linking, a cure can be determined by the amount of water released above that would occur from drying alone. The techniques used to measure the amount of water released during drying as compared to when a binder is cured, are well known in the art.

In accordance with the above paragraph, an uncured binder is one that has not been cured.

As used herein, the term alkaline indicates a solution having a pH that is greater than or equal to about 7. For example, the pH of the solution can be less than or equal to about 10. In addition, the solution may have a pH from about 7 to about 10, or from about 8 to about 10, or from about 9 to about 10.

As used herein, the term .ammonium. includes, but is not limited to, $^+NH_4$, $^+NH_3R^1$, and $^+NH_2R^1R^2$, where $R^1$ and $R^2$ are each independently selected in $^+NH_2R^1R^2$, and where $R^1$ and $R^2$ are selected from alkyl, cycloalkyl, alkenyl, cycloalkenyl, heterocyclyl, aryl, and heteroaryl.

The term alkyl refers to a saturated monovalent chain of carbon atoms, which may be optionally branched; the term cycloalkyl refers to a monovalent chain of carbon atoms, a portion of which forms a ring; the term alkenyl refers to an unsaturated monovalent chain of carbon atoms including at least one double bond, which may be optionally branched; the term cycloalkenyl refers to an unsaturated monovalent chain of carbon atoms, a portion of which forms a ring; the term heterocyclyl refers to a monovalent chain of carbon and heteroatoms, wherein the heteroatoms are selected from nitrogen, oxygen, and sulfur, a portion of which, including at least one heteroatom, form a ring; the term aryl refers to an aromatic mono or polycyclic ring of carbon atoms, such as phenyl, naphthyl, and the like; and the term heteroaryl refers to an aromatic mono or polycyclic ring of carbon atoms and at least one heteroatom selected from nitrogen, oxygen, and sulfur, such as pyridinyl, pyrimidinyl, indolyl, benzoxazolyl, and the like. It is to be understood that each of alkyl, cycloalkyl, alkenyl, cycloalkenyl, and heterocyclyl may be optionally substituted with independently selected groups such as alkyl, haloalkyl, hydroxyalkyl, aminoalkyl, carboxylic acid and derivatives thereof, including esters, amides, and nitriles, hydroxy, alkoxy, acyloxy, amino, alkyl and dialkylamino, acylamino, thio, and the like, and combinations thereof. It is further to be understood that each of aryl and heteroaryl may be optionally substituted with one or more independently selected substituents, such as halo, hydroxy, amino, alkyl or dialkylamino, alkoxy, alkylsulfonyl, cyano, nitro, and the like.

As used herein, the term polycarboxylic acid indicates a dicarboxylic, tricarboxylic, tetracarboxylic, pentacarboxylic, and like monomeric polycarboxylic acids, and anhydrides, and combinations thereof, as well as polymeric polycarboxylic acids, anhydrides, copolymers, and combinations thereof. In one aspect, the polycarboxylic acid ammonium salt reactant is sufficiently non-volatile to maximize its ability to remain available for reaction with the carbohydrate reactant of a Maillard reaction (discussed below). In another aspect, the polycarboxylic acid ammonium salt reactant may be substituted with other chemical functional groups. Illustratively, a monomeric polycarboxylic acid may be a dicarboxylic acid, including, but not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like. Or, illustratively, the polycarboxylic acid(s) itself may be a tricarboxylic acid, including, but not limited to, unsaturated aliphatic tricarboxylic acids, saturated aliphatic tricarboxylic acids, aromatic tricarboxylic acids, unsaturated cyclic tricarboxylic acids, saturated cyclic tricarboxylic acids, hydroxy-substituted derivatives thereof, and the like. It is appreciated that any such polycarboxylic acids may be optionally substituted, such as with hydroxy, halo, alkyl, alkoxy, and the like. In one variation, the polycarboxylic acid is the saturated aliphatic tricarboxylic acid, citric acid. Other suitable polycarboxylic acids are contemplated to include, but are not limited to, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to alcohol then carboxylic acid, maleic acid, malic acid, mesaconic acid, biphenol A or bisphenol F reacted via the KOLBE-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, and the like, and anhydrides, and combinations thereof.

Illustratively, a polymeric polycarboxylic acid may be an acid, for example, polyacrylic acid, polymethacrylic acid, polymaleic acid, and like polymeric polycarboxylic acids, copolymers thereof, anhydrides thereof, and mixtures thereof. Examples of commercially available polyacrylic acids include AQUASET-529 (Rohm & Haas, Philadelphia, Pa., USA), CRITERION 2000 (Kemira, Helsinki, Finland, Europe), NF1 (H. B. Fuller, St. Paul, Minn., USA), and SOKALAN (BASF, Ludwigshafen, Germany, Europe). With respect to SOKALAN, this is a watersoluble polyacrylic copolymer of acrylic acid and maleic acid, having a molecular weight of approximately 4000. AQUASET-529 is a composition containing polyacrylic acid cross-linked with glycerol, also containing sodium hypophosphite as a catalyst. CRITERION 2000 is an acidic solution of a partial salt of polyacrylic acid, having a molecular weight of approximately 2000. With respect to NF1, this is a copolymer containing carboxylic acid functionality and hydroxy functionality, as well as units with neither functionality; NF1 also contains chain transfer agents, such as sodium hypophosphite or organophosphate catalysts.

Further, compositions including polymeric polycarboxylic acids are also contemplated to be useful in preparing the binders described herein, such as those compositions described in U.S. Pat. Nos. 5,318,990, 5,661,213, 6,136,916, and 6,331,350, the disclosures of which are hereby incorporated herein by reference. In particular, in U.S. Pat. Nos. 5,318,990 and 6,331,350 an aqueous solution of a polymeric polycarboxylic acid, a polyol, and a catalyst is described.

As described in U.S. Pat. Nos. 5,318,990 and 6,331,350, the polymeric polycarboxylic acid comprises an organic polymer or oligomer containing more than one pendant carboxy group. The polymeric polycarboxylic acid may be a homopolymer or copolymer prepared from unsaturated carboxylic acids including, but not necessarily limited to, acrylic acid, methacrylic acid, crotonic acid, isocrotonic acid, maleic acid, cinnamic acid, 2-methylmaleic acid, itaconic acid, 2-methylitaconic acid, $\alpha,\beta$-methyleneglutaric acid, and the like. Alternatively, the polymeric polycarboxylic acid may be prepared from unsaturated anhydrides including, but not necessarily limited to, maleic anhydride, itaconic anhydride, acrylic anhydride, methacrylic anhydride, and the like, as well as mixtures thereof. Methods for polymerizing these acids and anhydrides are well-known in the chemical art. The polymeric polycarboxylic acid may additionally comprise a copolymer of one or more of the aforementioned unsaturated carboxylic acids or anhydrides and one or more vinyl compounds including, but not necessarily limited to, styrene, $\alpha$-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, vinyl acetate, and the like. Methods for preparing these copolymers are well-known in the art. The polymeric polycarboxylic acids may comprise homopolymers and copolymers of polyacrylic acid. The molecular weight of the polymeric polycarboxylic acid, and in particular polyacrylic acid polymer, may be is less than 10000, less than 5000, or about 3000 or less. For example, the molecular weight may be 2000.

As described in U.S. Pat. Nos. 5,318,990 and 6,331,350, the polyol (in a composition including a polymeric polycarboxylic acid) contains at least two hydroxyl groups. The polyol should be sufficiently nonvolatile such that it will substantially remain available for reaction with the polymeric polycarboxylic acid in the composition during heating and curing operations. The polyol may be a compound with a molecular weight less than about 1000 bearing at least two hydroxyl groups such as, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols, for example, $\beta$-hydroxyalkylamides such as, for example, bis[N,N-di($\beta$-hydroxyethyl)]adipamide, or it may be an addition polymer containing at least two hydroxyl groups such as, polyvinyl alcohol, partially hydrolyzed polyvinyl acetate, and homopolymers or copolymers of hydroxyethyl(meth)acrylate, hydroxypropyl(meth)acrylate, and the like.

As described in U.S. Pat. Nos. 5,318,990 and 6,331,350, the catalyst (in a composition including a polymeric polycarboxylic acid) is a phosphorous-containing accelerator which may be a compound with a molecular weight less than about 1000 such as, an alkali metal polyphosphate, an alkali metal dihydrogen phosphate, a polyphosphoric acid, and an alkyl phosphinic acid or it may be an oligomer or polymer bearing phosphorous-containing groups, for example, addition polymers of acrylic and/or maleic acids formed in the presence of sodium hypophosphite, addition polymers prepared from ethylenically unsaturated monomers in the presence of phosphorous salt chain transfer agents or terminators, and addition polymers containing acid-functional monomer residues, for example, copolymerized phosphoethyl methacrylate, and like phosphonic acid esters, and copolymerized vinyl sulfonic acid monomers, and their salts. The phosphorous-containing accelerator may be used at a level of from about 1% to about 40%, by weight based on the combined weight of the polymeric polycarboxylic acid and the polyol. A level of phosphorous containing accelerator of from about 2.5% to about 10%, by weight based on the combined weight of the polymeric polycarboxylic acid and the polyol may be used.

Examples of such catalysts include, but are not limited to, sodium hypophosphite, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, and sodium tetrametaphosphate, as well as mixtures thereof. Compositions including polymeric polycarboxylic acids described in U.S. Pat. Nos. 5,661,213 and 6,136,916 that are contemplated to be useful in preparing the binders described herein comprise an aqueous solution of a polymeric polycarboxylic acid, a polyol containing at least two hydroxyl groups, and a phosphorous-containing accelerator, wherein the ratio of the number of equivalents of carboxylic acid groups, to the number of equivalents of hydroxyl groups is from about 1:0.01 to about 1:3.

As disclosed in U.S. Pat. Nos. 5,661,213 and 6,136,916, the polymeric polycarboxylic acid may be, a polyester containing at least two carboxylic acid groups or an addition polymer or oligomer containing at least two copolymerized carboxylic acid-functional monomers. The polymeric polycarboxylic acid is preferably an addition polymer formed from at least one ethylenically unsaturated monomer. The addition polymer may be in the form of a solution of the addition polymer in an aqueous medium such as, an alkali-soluble resin which has been solubilized in a basic medium; in the form of an aqueous dispersion, for example, an emulsion-polymerized dispersion; or in the form of an aqueous suspension. The addition polymer must contain at least two carboxylic acid groups, anhydride groups, or salts thereof. Ethylenically unsaturated carboxylic acids such as, methacrylic acid, acrylic acid, crotonic acid, fumaric acid, maleic acid, 2-methyl maleic acid, itaconic acid, 2-methyl itaconic acid, $\alpha,\beta$-methyleneglutaric acid, monoalkyl maleates, and monoalkyl fumarates; ethylenically unsaturated anhydrides, for example, maleic anhydride, itaconic anhydride, acrylic anhydride, and methacrylic anhydride; and salts thereof, at a level of from about 1% to 100%, by weight, based on the weight of the addition polymer, may be used. Additional ethylenically unsaturated monomer may include acrylic ester monomers including methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; acrylamide or substituted acrylamides; styrene or substituted styrenes; butadiene; vinyl acetate or other vinyl esters; acrylonitrile or methacrylonitrile; and the like. The addition polymer containing at least two carboxylic acid groups, anhydride groups, or salts thereof may have a molecular weight from about 300 to about 10,000,000. A molecular weight from about 1000 to about 250,000 may be used. When the addition polymer is an alkali-soluble resin having a carboxylic acid, anhydride, or salt thereof, content of from about 5% to about 30%, by weight based on the total weight of the addition polymer, a molecular weight from about 10,000 to about 100,000 may be utilized Methods for preparing these additional polymers are well-known in the art.

As described in U.S. Pat. Nos. 5,661,213 and 6,136,916, the polyol (in a composition including a polymeric polycarboxylic acid) contains at least two hydroxyl groups and should be sufficiently nonvolatile that it remains substantially available for reaction with the polymeric polycarboxylic acid in the composition during heating and curing operations. The polyol may be a compound with a molecular weight less than about 1000 bearing at least two hydroxyl groups, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols, for example, β-hydroxyalkylamides, for example, bis[N,N-di(β-hydroxyethyl)]adipamide, bis[N,Ndi(β-hydroxypropyl)] azelamide, bis[N-N-di(β-hydroxypropyl)]adipamide, bis[N-Ndi(β-hydroxypropyl)]glutaramide, bis[N-N-di(β-hydroxypropyl)]succinamide, and bis[N-methyl-N-(β-hydroxyethyl)]oxamide, or it may be an addition polymer containing at least two hydroxyl groups such as, polyvinyl alcohol, partially hydrolyzed polyvinyl acetate, and homopolymers or copolymers of hydroxyethyl(meth)acrylate, hydroxypropyl (meth)acrylate, and the like.

As described in U.S. Pat. Nos. 5,661,213 and 6,136,916, the phosphorous-containing accelerator (in a composition including a polymeric polycarboxylic acid) may be a compound with a molecular weight less than about 1000 such as, an alkali metal hypophosphite salt, an alkali metal phosphite, an alkali metal polyphosphate, an alkali metal dihydrogen phosphate, a polyphosphoric acid, and an alkyl phosphinic acid or it may be an oligomer or polymer bearing phosphorous-containing groups such as, addition polymers of acrylic and/or maleic acids formed in the presence of sodium hypophosphite, addition polymers prepared from ethylenically unsaturated monomers in the presence of phosphorous salt chain transfer agents or terminators, and addition polymers containing acid-functional monomer residues such as, copolymerized phosphoethyl methacrylate, and like phosphonic acid esters, and copolymerized vinyl sulfonic acid monomers, and their salts. The phosphorous-containing accelerator may be used at a level of from about 1% to about 40%, by weight based on the combined weight of the polyacid and the polyol. A level of phosphorous-containing accelerator of from about 2.5% to about 10%, by weight based on the combined weight of the polyacid and the polyol, may be utilized.

As used herein, the term .amine base. includes, but is not limited to, ammonia, a primary amine, i.e., $NH_2R^1$, and a secondary amine, i.e., $NHR^1R^2$, where $R^1$ and $R^2$ are each independently selected in $NHR^1R^2$, and where $R^1$ and $R^2$ are selected from alkyl, cycloalkyl, alkenyl, cycloalkenyl, heterocyclyl, aryl, and heteroaryl, as defined herein. Illustratively, the amine base may be substantially volatile or substantially non-volatile under conditions sufficient to promote formation of the thermoset binder during thermal curing. Illustratively, the amine base may be a substantially volatile base, such as, ammonia, ethylamine, diethylamine, dimethylamine, and ethylpropylamine. Alternatively, the amine base may be a substantially non-volatile base, for example, aniline, 1-naphthylamine, 2-naphthylamine, and para-aminophenol.

As used herein, reducing sugar indicates one or more sugars that contain aldehyde groups, or that can isomerize, i.e., tautomerize, to contain aldehyde groups, which groups are reactive with an amino group under Maillard reaction conditions and which groups may be oxidized with, for example, $Cu^{+2}$ to afford carboxylic acids. It is also appreciated that any such carbohydrate reactant may be optionally substituted, such as with hydroxy, halo, alkyl, alkoxy, and the like. It is further appreciated that in any such carbohydrate reactant, one or more chiral centers are present, and that both possible optical isomers at each chiral center are contemplated to be included in the invention described herein. Further, it is also to be understood that various mixtures, including racemic mixtures, or other diastereomeric mixtures of the various optical isomers of any such carbohydrate reactant, as well as various geometric isomers thereof, may be used in one or more embodiments described herein.

Figure 7:
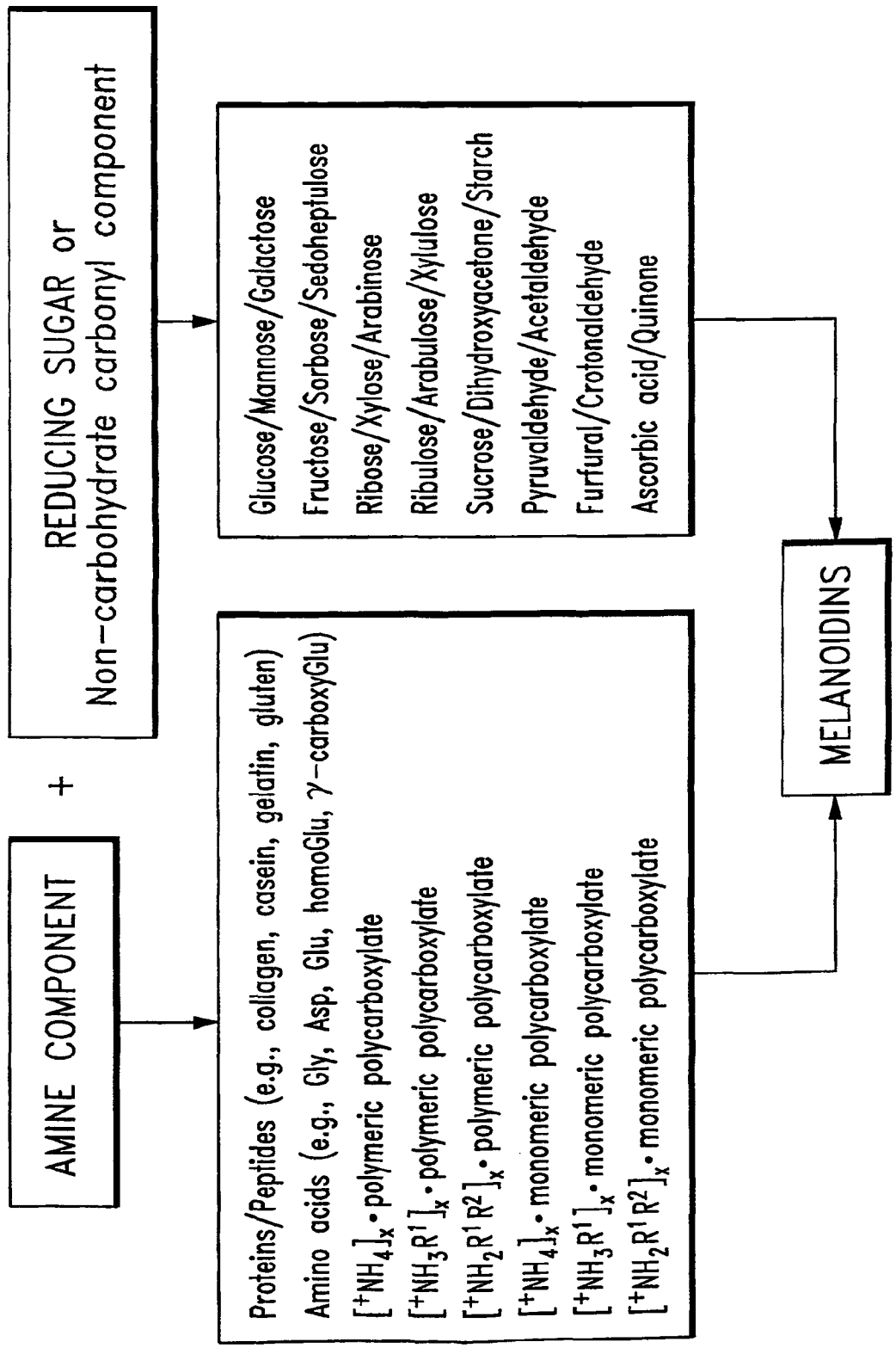
FIG. 7 shows a number of illustrative reactants for producing melanoidins.

FIG. 7 shows examples of reactants for a Maillard reaction. Examples of amine reactants include proteins, peptides, amino acids, ammonium salts of polymeric polycarboxylic acids, and ammonium salts of monomeric polycarboxylic acids. As illustrated, .ammonium. can be $[^+NH_4]_x$, $[^+NH_3R^1]_x$, and $[^+NH_2R^1R^2]_x$, where x is at least about 1. With respect to $^+NH_2R^1R^2$, $R^1$ and $R^2$ are each independently selected. Moreover, $R^1$ and $R^2$ are selected from alkyl, cycloalkyl, alkenyl, cycloalkenyl, heterocyclyl, aryl, and heteroaryl, as described above. FIG. 1 also illustrates examples of reducing-sugar reactants for producing melanoidins, including monosaccharides, in their aldose or ketose form, polysaccharides, or combinations thereof. Illustrative noncarbohydrate carbonyl reactants for producing melanoidins are also shown in FIG. 1 and include various aldehydes, e.g., pyruvaldehyde and furfural, as well as compounds such as ascorbic acid and quinone.

FIG. 8 shows a schematic of a Maillard reaction, which culminates in the production of melanoidins. In its initial phase, a Maillard reaction involves a carbohydrate reactant, for example, a reducing sugar (note that the carbohydrate reactant may come from a substance capable of producing a reducing sugar under Maillard reaction conditions). The reaction also involves condensing the carbohydrate reactant (e.g., reducing sugar) with an amine reactant, i.e., a compound possessing an amino group. In other words, the carbohydrate reactant and the amine reactant are the melanoidin reactants for a Maillard reaction. The condensation of these two constituents produces an N-substituted glycosylamine. For a more detailed description of the Maillard reaction see, Hodge, J. E. Chemistry of Browning Reactions in Model Systems *J. Agric. Food Chem.* 1953, 1, 928-943, the disclosure of which is hereby incorporated herein by reference. The compound possessing a free amino group in a Maillard reaction may be present in the form of an amino acid. The free amino group can also come from a protein where the free amino groups are available in the form of, for example, the α-amino group of lysine residues, and/or the ε-amino group of the terminal amino acid.

Another aspect of conducting a Maillard reaction as described herein is that, initially, the aqueous Maillard reactant solution (which also is a binder), as described above, has an alkaline pH. However, once the solution is disposed on a collection of non or loosely assembled matter, and curing is initiated, the pH decreases (i.e., the binder becomes acidic). It should be understood that when fabricating a material, the amount of contact between the binder and components of machinery used in the fabrication is greater prior to curing, (i.e., when the binder solution is alkaline) as compared to after the binder is cured (i.e., when the binder is acidic). An alkaline composition is less corrosive than an acidic composition. Accordingly, corrosivity of the fabrication process is decreased.

It should be appreciated that by using the aqueous Maillard reactant solution described herein, the machinery used to fabricate fiberglass is not exposed as much to an acidic solution because, as described above, the pH of the Maillard reactant solution is alkaline. Furthermore, during the fabrication the only time an acidic condition develops is after the binder has been applied to fibers. Once the binder is applied to the fibers, the binder and the material that incorporates the binder, has relatively infrequent contacts with the components of the machinery as compared to the time prior to applying the binder to the fibers. Accordingly, corrosivity of fiberglass fabrication (and the fabrication of other materials) is decreased.

Without being bound to theory, covalent reaction of the polycarboxylic acid ammonium salt and reducing sugar reactants of a Maillard reaction, which as described herein occurs substantially during thermal curing to produce brown-colored nitrogenous polymeric and co-polymeric melanoidins of varying structure, is thought to involve initial Maillard reaction of ammonia with the aldehyde moiety of a reducing-sugar carbohydrate reactant to afford N-substituted glycosylamine, as shown in FIG. 8. Consumption of ammonia in such a way, with ammonia and a reducing sugar carbohydrate reactant combination functioning as a latent acid catalyst, would be expected to result in a decrease in pH, which decrease is believed to promote esterification processes and/ or dehydration of the polycarboxylic acid to afford its corresponding anhydride derivative. At pH<7, the Amadori rearrangement product of N-substituted glycosylamine, i.e., 1-amino-1-deoxy-2-ketose, would be expected to undergo mainly 1,2-enolization with the formation of furfural when, for example, pentoses are involved, or hydroxymethylfurfural when, for example, hexoses are involved, as a prelude to melanoidin production. Concurrently, contemporaneously, or sequentially with the production of melanoidins, esterification processes may occur involving melanoidins, polycarboxylic acid and/or its corresponding anhydride derivative, and residual carbohydrate, which processes lead to extensive cross-linking. Accompanied by sugar dehydration reactions, whereupon conjugated double bonds are produced that may undergo polymerization, a water-resistant thermoset binder is produced consisting of polyester adducts interconnected by a network of carbon carbon single bonds. Consistent with the above reaction scenario is a strong absorbance near 1734 cm−1 in the FT-IR spectrum of a cured binder described herein, which absorbance is within the 1750-1730 cm−1 range expected for ester carbonyl C—O vibrations.

The following discussion is directed to (i) examples of carbohydrate and amine reactants, which can be used in a Maillard reaction and (ii) how these reactants can be combined. First, it should be understood that any carbohydrate and/or compound possessing a primary or secondary amino group, that will act as a reactant in a Maillard reaction, can be utilized in the binders of the present invention. Such compounds can be identified and utilized by one of ordinary skill in the art with the guidelines disclosed herein.

With respect to exemplary reactants, it should also be appreciated that using an ammonium salt of a polycarboxylic acid as an amine reactant is an effective reactant in a Maillard reaction. Ammonium salts of polycarboxylic acids can be generated by neutralizing the acid groups with an amine base, thereby producing polycarboxylic acid ammonium salt groups. Complete neutralization, i.e., about 100% calculated on an equivalents basis, may eliminate any need to titrate or partially neutralize acid groups in the polycarboxylic acid(s) prior to binder formation. However, it is expected that lessthan-complete neutralization would not inhibit formation of the binder. Note that neutralization of the acid groups of the polycarboxylic acid(s) may be carried out either before or after the polycarboxylic acid(s) is mixed with the carbohydrate(s).

With respect to the carbohydrate reactant, it may include one or more reactants having one or more reducing sugars. In one aspect, any carbohydrate reactant should be sufficiently nonvolatile to maximize its ability to remain available for reaction with the polycarboxylic acid ammonium salt reactant. The carbohydrate reactant may be a monosaccharide in its aldose or ketose form, including a triose, a tetrose, a pentose, a hexose, or a heptose; or a polysaccharide; or combinations thereof. A carbohydrate reactant may be a reducing sugar, or one that yields one or more reducing sugars in situ under thermal curing conditions. For example, when a triose serves as the carbohydrate reactant, or is used in combination with other reducing sugars and/or a polysaccharide, an aldotriose sugar or a ketotriose sugar may be utilized, such as glyceraldehyde and dihydroxyacetone, respectively. When a tetrose serves as the carbohydrate reactant, or is used in combination with other reducing sugars and/or a polysaccharide, aldotetrose sugars, such as erythrose and threose; and ketotetrose sugars, such as erythrulose, may be utilized. When a pentose serves as the carbohydrate reactant, or is used in combination with other reducing sugars and/or a polysaccharide, aldopentose sugars, such as ribose, arabinose, xylose, and lyxose; and ketopentose sugars, such as ribulose, arabulose, xylulose, and lyxulose, may be utilized. When a hexose serves as the carbohydrate reactant, or is used in combination with other reducing sugars and/or a polysaccharide, aldohexose sugars, such as glucose (i.e., dextrose), mannose, galactose, allose, altrose, talose, gulose, and idose; and ketohexose sugars, such as fructose, psicose, sorbose and tagatose, may be utilized. When a heptose serves as the carbohydrate reactant, or is used in combination with other reducing sugars and/or a polysaccharide, a ketoheptose sugar such as sedoheptulose may be utilized. Other stereoisomers of such carbohydrate reactants not known to occur naturally are also contemplated to be useful in preparing the binder compositions as described herein. When a polysaccharide serves as the carbohydrate, or is used in combination with monosaccharides, sucrose, lactose, maltose, starch, and cellulose may be utilized.

Furthermore, the carbohydrate reactant in the Maillard reaction may be used in combination with a non-carbohydrate polyhydroxy reactant. Examples of non-carbohydrate polyhydroxy reactants which can be used in combination with the carbohydrate reactant include, but are not limited to, trimethylolpropane, glycerol, pentaerythritol, polyvinyl alcohol, partially hydrolyzed polyvinyl acetate, fully hydrolyzed polyvinyl acetate, and mixtures thereof. In one aspect, the noncarbohydrate polyhydroxy reactant is sufficiently nonvolatile to maximize its ability to remain available for reaction with a monomeric or polymeric polycarboxylic acid reactant. It is appreciated that the hydrophobicity of the noncarbohydrate polyhydroxy reactant may be a factor in determining the physical properties of a binder prepared as described herein.

When a partially hydrolyzed polyvinyl acetate serves as a non carbohydrate polyhydroxy reactant, a commercially available compound such as an 87-89% hydrolyzed polyvinyl acetate may be utilized, such as, DuPont ELVANOL 51-05. DuPont ELVANOL 51-05 has a molecular weight of about 22,000-26,000 Da and a viscosity of about 5.0-6.0 centipoises. Other partially hydrolyzed polyvinyl acetates contemplated to be useful in preparing binder compositions as described herein include, but are not limited to, 87-89% hydrolyzed polyvinyl acetates differing in molecular weight and viscosity from ELVANOL 51-05, such as, for example, DuPont ELVANOL 51-04, ELVANOL 51-08, ELVANOL 50-14, ELVANOL 52-22, ELVANOL 50-26, ELVANOL 50-42; and partially hydrolyzed polyvinyl acetates differing in molecular weight, viscosity, and/or degree of hydrolysis from ELVANOL 51-05, such as, DuPont ELVANOL 51-03 (86-89% hydrolyzed), ELVANOL 70-14 (95.0-97.0% hydrolyzed), ELVANOL 70-27 (95.5-96.5% hydrolyzed), ELVANOL 60-30 (90-93% hydrolyzed). Other partially hydrolyzed polyvinyl acetates contemplated to be useful in preparing binder compositions as described herein include, but are not limited to, Clariant MOWIOL 15-79, MOWIOL 3-83, MOWIOL 4-88, MOWIOL 5-88, MOWIOL 8-88, MOWIOL 18-88, MOWIOL 23-88, MOWIOL 26-88, MOWIOL 40-88, MOWIOL 47-88, and MOWIOL 30-92, as well as Celanese CELVOL 203, CELVOL 205, CELVOL 502, 5 CELVOL 504, CELVOL 513, CELVOL 523, CELVOL 523TV, CELVOL 530, CELVOL 540, CELVOL 540TV, CELVOL 418, CELVOL 425, and CELVOL 443. Also contemplated to be useful are similar or analogous partially hydrolyzed polyvinyl acetates available from other commercial suppliers.

When a fully hydrolyzed polyvinyl acetate serves as a noncarbohydrate polyhydroxy reactant, Clariant MOWIOL 4-98, having a molecular weight of about 27,000 Da, may be utilized. Other fully hydrolyzed polyvinyl acetates contemplated to be useful include, but are not limited to, DuPont ELVANOL 70-03 (98.0-98.8% hydrolyzed), ELVANOL 70-04 (98.0-98.8% hydrolyzed), ELVANOL 70-06 (98.5-99.2% hydrolyzed), ELVANOL 90-50 (99.0-99.8% hydrolyzed), ELVANOL 70-20 (98.5-99.2% hydrolyzed), ELVANOL 70-30 (98.5-99.2% hydrolyzed), ELVANOL 71-30 (99.0-99.8% hydrolyzed), ELVANOL 70-62 (98.4-99.8% hydrolyzed), ELVANOL 70-63 (98.5-99.2% hydrolyzed), ELVANOL 70-75 (98.5-99.2% hydrolyzed), Clariant MOWIOL 3-98, MOWIOL 6-98, MOWIOL 10-98, MOWIOL 20-98, MOWIOL 56-98, MOWIOL 28-99, and Celanese CELVOL 103, CELVOL 107, CELVOL 305, CELVOL 310, CELVOL 325, CELVOL 325LA, and CELVOL 350, as well as similar or analogous fully hydrolyzed polyvinyl acetates from other commercial suppliers.

The aforementioned Maillard reactants may be combined to make an aqueous composition that includes a carbohydrate reactant and an amine reactant. These aqueous binders represent examples of uncured binders. As discussed below, these aqueous compositions can be used as binders of the present invention. These binders are formaldehyde-free, curable, alkaline, aqueous binder compositions. Furthermore, as indicated above, the carbohydrate reactant of the Maillard reactants may be used in combination with a non-carbohydrate polyhydroxy reactant. Accordingly, any time the carbohydrate reactant is mentioned it should be understood that it can be used in combination with a non-carbohydrate polyhydroxy reactant.

In one illustrative embodiment, the aqueous solution of Maillard reactants may include (i) an ammonium salt of one or more polycarboxylic acid reactants and (ii) one or more carbohydrate reactants having a reducing sugar. The pH of this solution prior to placing it in contact with the material to be bound can be greater than or equal to about 7. In addition, this solution can have a pH of less than or equal to about 10. The ratio of the number of moles of the polycarboxylic acid reactant(s) to the number of moles of the carbohydrate reactant(s) can be in the range from about 1:4 to about 1:15. In one example, the ratio of the number of moles of the polycarboxylic acid reactant(s) to the number of moles of the carbohydrate reactant(s) in the binder composition is about 1:5. In another example, the ratio of the number of moles of the polycarboxylic acid reactant(s) to the number of moles of the carbohydrate reactant(s) is about 1:6. In yet another example, the ratio of the number of moles of the polycarboxylic acid reactant(s) to the number of moles of the carbohydrate reactant(s) is about 1:7.

As described above, the aqueous binder composition includes (i) an ammonium salt of one or more polycarboxylic acid reactants and (ii) one or more carbohydrate reactants having a reducing sugar. It should be appreciated that when an ammonium salt of a monomeric or a polymeric polycarboxylic acid is used as an amine reactant, the molar equivalents of ammonium ion may or may not be equal to the molar equivalents of acid salt groups present on the polycarboxylic acid. In one illustrative example, an ammonium salt may be monobasic, dibasic, or tribasic when a tricarboxylic acid is used as a polycarboxylic acid reactant. Thus, the molar equivalents of the ammonium ion may be present in an amount less than or about equal to the molar equivalents of acid salt groups present in a polycarboxylic acid. Accordingly, the salt can be monobasic or dibasic when the polycarboxylic acid reactant is a dicarboxylic acid. Further, the molar equivalents of ammonium ion may be present in an amount less than, or about equal to, the molar equivalents of acid salt groups present in a polymeric polycarboxylic acid, and so on and so forth. When a monobasic salt of a dicarboxylic acid is used, or when a dibasic salt of a tricarboxylic acid is used, or when the molar equivalents of ammonium ions are present in an amount less than the molar equivalents of acid salt groups present in a polymeric polycarboxylic acid, the pH of the binder composition may require adjustment to achieve alkalinity.

The uncured, formaldehyde-free, thermally-curable, alkaline, aqueous binder composition can be used to fabricate a number of different materials. In particular, these binders can be used to produce or promote cohesion in non or loosely assembled matter by placing the binder in contact with the matter to be bound. Any number of well known techniques can be employed to place the aqueous binder in contact with the material to be bound. For example, the aqueous binder can be sprayed on (for example during the binding glass fibers) or applied via a roll-coat apparatus. These aqueous binders can be applied to a mat of glass fibers (e.g., sprayed onto the mat), during production of fiberglass insulation products. Once the aqueous binder is in contact with the glass fibers the residual heat from the glass fibers (note that the glass fibers are made from molten glass and thus contain residual heat) and the flow of air through the fibrous mat will evaporate (i.e., remove) water from the binder. Removing the water leaves the remaining components of the binder on the fibers as a coating of viscous or semi-viscous high-solids liquid. This coating of viscous or semi-viscous high-solids liquid functions as a binder. At this point, the mat has not been cured. In other words, the uncured binder functions to bind the glass fibers in the mat.

Furthermore, it should be understood that the above described aqueous binders can be cured. For example, any of the above described aqueous binders can be disposed (e.g., sprayed) on the material to be bound, and then heated. For example, in the case of making fiberglass insulation products, after the aqueous binder has been applied to the mat, the binder coated mat is transferred to a curing oven. In the curing oven the mat is heated (e.g., from about 300° F. to about 600° F.) and the binder cured. The cured binder is a formaldehyde-free, water-resistant thermoset binder that attaches the glass fibers of the mat together. Note that the drying and thermal curing may occur either sequentially, contemporaneously, or concurrently.

With respect to making binders that are water-insoluble when cured, it should be appreciated that the ratio of the number of molar equivalents of acid salt groups present on the polycarboxylic acid reactant(s) to the number of molar equivalents of hydroxyl groups present on the carbohydrate reactant(s) may be in the range from about 0.04:1 to about 0.15:1. After curing, these formulations result in a water-resistant thermoset binder. In one variation, the number of molar equivalents of hydroxyl groups present on the carbohydrate reactant(s) is about twenty five-fold greater than the number of molar equivalents of acid salt groups present on the polycarboxylic acid reactant(s). In another variation, the number of molar equivalents of hydroxyl groups present on the carbohydrate reactant(s) is about ten-fold greater than the number of molar equivalents of acid salt groups present on the polycarboxylic acid reactant(s). In yet another variation, the number of molar equivalents of hydroxyl groups present on the carbohydrate reactant(s) is about sixfold greater than the number of molar equivalents of acid salt groups present on the polycarboxylic acid reactant(s).

In other embodiments of the invention, a binder that is already cured can disposed on a material to be bound. As indicated above, most cured binders will typically contain water-insoluble melanoidins. Accordingly, these binders will also be water-resistant thermoset binders.

As discussed below, various additives can be incorporated into the binder composition. These additives give the binders of the present invention additional desirable characteristics. For example, the binder may include a silicon containing coupling agent. Many silicon-containing coupling agents are commercially available from the Dow-Corning Corporation, Petrarch Systems, and by the General Electric Company. Illustratively, the silicon-containing coupling agent includes compounds such as silylethers and alkylsilyl ethers, each of which may be optionally substituted, such as with halogen, alkoxy, amino, and the like. In one variation, the silicon-containing compound is an amino-substituted silane, such as, gamma-aminopropyltriethoxy silane (General Electric Silicones, SILQUEST A-1101; Wilton, Conn.; USA). In another variation, the silicon-containing compound is an amino-substituted silane, for example, aminoethylaminopropyltrimethoxy silane (Dow Z-6020; Dow Chemical, Midland, Mich.; USA). In another variation, the silicon containing compound is gamma-glycidoxypropyltrimethoxysilane (General Electric Silicones, SILQUEST A-187). In yet another variation, the silicon-containing compound is an n-propylamine silane (Creanova (formerly Huls America) HYDROSIL 2627; Creanova; Somerset, N.J.; U.S.A.).

The silicon-containing coupling agents are typically present in the binder in the range from about 0.1 percent to about 1 percent by weight based upon the dissolved binder solids (i.e., about 0.1 percent to about 1 percent based upon the weight of the solids added to the aqueous solution). In one application, one or more of these silicon-containing compounds can be added to the aqueous uncured binder. The binder is then applied to the material to be bound. Thereafter, the binder may be cured if desired. These silicone containing compounds enhance the ability of the binder to adhere to the matter the binder is disposed on, such as glass fibers. Enhancing the binder.s ability to adhere to the matter improves, for example, its ability to produce or promote cohesion in non or loosely assembled substance(s).

A binder that includes a silicone containing coupling agent can be prepared by admixing about 10 to about 50 weight percent aqueous solution of one or more polycarboxylic acid reactants, already neutralized with an amine base or neutralized in situ, with about 10-50 weight percent aqueous solution of one or more carbohydrate reactants having reducing sugar, and an effective amount of a silicon containing coupling agent. In one variation, one or more polycarboxylic acid reactants and one or more carbohydrate reactants, the latter having reducing sugar, may be combined as solids, mixed with water, and the mixture then treated with aqueous amine base (to neutralize the one or more polycarboxylic acid reactants) and a silicon-containing coupling agent to generate an aqueous solution 10-50 weight percent in each polycarboxylic acid reactant and each carbohydrate reactant.

In another illustrative embodiment, a binder of the present invention may include one or more corrosion inhibitors. These corrosion inhibitors prevent or inhibit the eating or wearing away of a substance, such as, metal caused by chemical decomposition brought about by an acid. When a corrosion inhibitor is included in a binder of the present invention, the binder's corrosivity is decreased as compared to the corrosivity of the binder without the inhibitor present. In one embodiment, these corrosion inhibitors can be utilized to decrease the corrosivity of the glass fiber containing compositions described herein. Illustratively, corrosion inhibitors include one or more of the following, a dedusting oil, or a monoammonium phosphate, sodium metasilicate pentahydrate, melamine, tin(II) oxalate, and/or methylhydrogen silicone fluid emulsion. When included in a binder of the present invention, corrosion inhibitors are typically present in the binder in the range from about 0.5 percent to about 2 percent by weight based upon the dissolved binder solids.

By following the disclosed guidelines, one of ordinary skill in the art will be able to vary the concentrations of the reactants of the aqueous binder to produce a wide range of binder compositions. In particular, aqueous binder compositions can be formulated to have an alkaline pH. For example, a pH in the range from greater than or equal to about 7 to less than or equal to about 10. Examples of the binder reactants that can be manipulated include (i) the polycarboxylic acid reactant(s), (ii) the amine base, (iii) the carbohydrate reactant(s), (iv) the silicon-containing coupling agent, and (v) the corrosion inhibitor compounds. Having the pH of the aqueous binders (e.g. uncured binders) of the present invention in the alkaline range inhibits the corrosion of materials the binder comes in contact with, such as machines used in the manufacturing process (e.g., in manufacturing fiberglass). Note this is especially true when the corrosivity of acidic binders is compared to binders of the present invention. Accordingly, the .life span. of the machinery increases while the cost of maintaining these machines decreases.

Furthermore, standard equipment can be used with the binders of the present invention, rather than having to utilize relatively corrosive resistant machine components that come into contact with acidic binders, such as stainless steel components. Therefore, the binders disclosed herein decrease the cost of manufacturing bound materials.

What is claimed is:

1. A composite wood board having dimensions of at least 11.8 inches×11.8 inches (30 cm×30 cm) comprising wood particles and an organic binder, wherein the organic binder is substantially formaldehyde free and is selected from the group consisting of:
   a binder based on a reducing sugar,
   a binder based on an aldehyde containing sugar,
   a binder which includes at least one reaction product of a carbohydrate reactant and an amine reactant,
   a binder which includes at least one reaction product of a reducing sugar and an amine reactant,
   a binder which includes at least one reaction product of a carbohydrate reactant and a polycarboxylic acid ammonium salt reactant, and
   a binder which includes at least one reaction product from a Maillard reaction;
   where the composite wood board has one or more of the following characteristics:
   a modulus of elasticity (MOE) of at least 1800 N/mm$^2$,
   a bending strength (MOR) of at least 14 N/mm$^2$,
   an internal bond strength (IB) of at least 0.28 N/mm$^2$,
   a thickness swelling after 24 hours in water at 20° C. of less than or equal to 12%,
   a water absorption after 24 hours in water at 20° C. of less than or equal to 40%.

2. The composite wood board of claim 1, wherein the composite wood board is formaldehyde free.

3. The composite wood board of claim 1, wherein the composite wood board has a modulus of elasticity (MOE) of at least about 1800 N/mm$^2$.

4. The composite wood board of claim 3, wherein the modulus of elasticity (MOE) is at least about 2500 N/mm$^2$.

5. The composite wood board of claim 1, wherein the composite wood board has a bending strength (MOR) of at least about 14 N/mm$^2$.

6. The composite wood board of claim 5, wherein the bending strength (MOR) is at least about 18 N/mm$^2$.

7. The composite wood board of claim 1, wherein the composite wood board has an internal bond strength (IB) of at least 0.28 N/mm$^2$.

8. The composite wood board of claim 7, wherein the internal bond strength (IB) is at least 0.4 N/mm$^2$.

9. The composite wood board of claim 1, wherein the composite wood board swells less than or equal to about 12%, as measured by a change in thickness, after 24 hours in water at 20° C.

10. The composite wood board of claim 9, wherein the composite wood board has a water absorption after 24 hours in water at 20° C. of less than or equal to about 40%.

11. The composite wood board of claim 1, wherein the composite wood board is a wood particleboard.

12. The composite wood board of claim 1, wherein the composite wood board is an orientated strandboard.

13. The composite wood board of claim 1, wherein the composite wood board is a medium density fiberboard.

14. The composite wood board of claim 1, wherein the organic binder comprises from about 8 to about 18% by weight (weight of dry resin to weight of dry wood particles) of the composite wood board.

15. The composite wood board of claim 1, wherein the organic binder comprises a product of a reaction including a reducing sugar.

16. The composite wood board of claim 15, wherein the organic binder comprises at least one Maillard reaction product.

17. The composite wood board of claim 1, wherein the organic binder comprises a product of a reaction of citric acid, ammonia and dextrose.

18. The composite wood board of claim 1, wherein the composite wood board further comprises a wax.

19. The composite wood board of claim 18, wherein the wax comprises from about 0.1 to about 2% by weight of the composite wood board.

20. The composite wood board of claim 1, wherein the organic binder is a bioresin.

* * * * *